US005751224A

United States Patent [19]

Fitzgibbon

[11] Patent Number: 5,751,224

[45] Date of Patent: May 12, 1998

[54] CODE LEARNING SYSTEM FOR A MOVABLE BARRIER OPERATOR

[75] Inventor: James J. Fitzgibbon, Streamwood, Ill.

[73] Assignee: The Chamberlain Group, Inc., Elmhurst, Ill.

[21] Appl. No.: 442,909

[22] Filed: May 17, 1995

[51] Int. Cl.$^6$ .......... G06F 15/20; H04B 7/00; H04Q 9/00

[52] U.S. Cl. .......... 340/825.22; 340/825.31; 340/825.34; 340/825.69; 340/825.22; 318/16; 160/188

[58] Field of Search .......... 340/825.22, 825.69, 340/825.72, 309.15, 825.31, 825.34, 908.1, 928; 307/141; 160/188; 364/141; 318/16

[56] References Cited

U.S. PATENT DOCUMENTS

| | | | |
|---|---|---|---|
| 3,906,348 | 9/1975 | Willmott | 325/37 |
| 4,037,201 | 7/1977 | Willmott | 340/167 |
| 4,141,010 | 2/1979 | Umpleby et al. | 343/225 |
| 4,305,060 | 12/1981 | Apple et al. | 340/825.65 |
| 4,529,980 | 7/1985 | Liotine et al. | 340/825.52 |
| 4,535,333 | 8/1985 | Twardowski | 340/825.69 |
| 4,583,081 | 4/1986 | Schmitz | 345/545 |
| 4,638,433 | 1/1987 | Schindler | 364/400 |
| 4,750,118 | 6/1988 | Heitschel et al. | 364/400 |
| 4,821,024 | 4/1989 | Bayha | 340/309.15 |
| 4,988,992 | 1/1991 | Heitschel et al. | 340/825.69 |
| 5,453,736 | 9/1995 | Noren | 340/825.22 |
| 5,481,452 | 1/1996 | Simmons | 364/141 |
| 5,533,561 | 7/1996 | Forehand, IV | 160/188 |

*Primary Examiner*—Michael Horabik
*Assistant Examiner*—Yonel Beaulieu
*Attorney, Agent, or Firm*—Fitch, Even, Tabin & Flannery

[57] ABSTRACT

A movable barrier or garage door operator has a control head controlling an electric motor connected to a movable barrier or garage door to open and close it. The control head has an RF receiver for receiving RF signals from a hand-held transmitter or a fixed keypad transmitter. The receiver operates the electric motor upon matching a received code with a stored code. The stored codes may be updated or loaded either by enabling the learn mode of the receiver from the fixed keypad transmitter or from a wired control unit positioned within the garage.

12 Claims, 11 Drawing Sheets

| Fig. 3a | Fig. 3b | Fig. 3c |
| --- | --- | --- |

CODE LEARNING SYSTEM FOR A MOVABLE BARRIER OPERATOR

BACKGROUND OF THE INVENTION

The invention relates, in general, to movable barrier operators and, in particular, to garage door operators having systems for receiving radio frequency transmissions that are encoded or encrypted to identify an authorized user of one or more transmitters.

A number of systems already exist for the control of movable barrier garage door operators using radio frequency transmitters. For instance, U.S. Pat. No. 4,750,118 discloses a transmitter for transmitting a multiple bit code which, when received and decoded by a receiver, causes the receiver to command a motor to open or close a garage door. Other systems, such as that disclosed in U.S. Pat. No. 3,906,348, employ a transmitter and a receiver wherein a plurality of mechanical switches may be used to establish a stored authorization code.

U.S. Pat. No. 4,529,980 to Liotine et al. discloses a transmitter and receiver combination for use in a garage door operator wherein the transmitter is able to store an authorization code which is to be transmitted to and received by the receiver over a radio frequency link. In order to alter or update the authorization code contained within the transmitter, the receiver is equipped with a programming signal transmitter or light emitting diode that can send a digitized optical signal back to the transmitter where it is stored. Other systems employing coded transmissions are disclosed in U.S. Pat. Nos. 4,037,201, 4,535,333, 4,638,433 and 4,988,992.

While each of these systems has in the past provided good security for operational use, they are relatively inconvenient or insecure for a user who wishes to establish a new fixed code for storage in a receiver. Many of the currently-available garage door operators include equipment that enables the receiver to learn a particular code. However, they are relatively inconvenient to use because they must be accessed by pressing a learn code button located on the head unit of the receiver which, of course, is normally mounted from the ceiling of the garage. Thus, the user would have to climb a step ladder, push the learn button and then either send newly encoded signals from an outside keypad or from a transmitter. If the apparatus does not employ an actuator which would cause a door to be moved, but relates, for instance, to an automotive security system, the learn button of necessity must be made even more inaccessible than the learn button on a garage door operator. For instance, an auto security system learn button might be positioned someplace underneath a locked hood or the like. Thus, it is very inconvenient, due to security requirements, to obtain access to the learn button.

What is needed then is an improved movable barrier operator or other type of actuator system employing coded transmissions which provide good security while enabling a code to be easily and conveniently altered.

SUMMARY OF THE INVENTION

The invention relates, in general, to an apparatus for controlling an actuator in response to receiving a coded transmission. The apparatus includes a portable radio frequency transmitter, a fixed radio transmitter, such as a keypad device, a wired control device connectable via direct wire connection, all connectable to a head unit or other actuator device. The system includes means for learning a new code from a transmitter or learning a new code from a fixed keypad having an RF transmission system. In the event that the fixed keypad is employed, the operator typically has an alphanumeric keyboard associated with the keypad having keys. A code may first be entered which allows the person to have access. This code is then followed by a learn authorization code which, for instance, may be 0000 or some other easily remembered combination of alphanumeric characters. At that point, the head unit authorizes receipt of a new code. The new code is then typed in on the alphanumeric pad of the keypad and is received by the head unit and stored therein as a new code from which to respond.

In an alternative mode of operating the code learning system, a radio frequency transmitter or the like may be used to enter a code which is to be stored within a receiver in the head unit. If such a radio frequency transmitter is to be used, the security to prevent unauthorized changing of the transmitter code is achieved through the use of the control pad which is located on the inside of the garage. The light switch for the control pad is held down and as it is held down, the command switch is actuated. The combination of the command signal and the light or work light signal is received by the head unit and the head unit then switches into a learn mode. The radio frequency transmitter must be up and transmitting a code at the time that the command button is pushed so that a code is immediately received by the antenna of the head unit. The code will then be stored in the receiver associated with the head unit and, from then on, actuation of the transmitter having that code stored therein will cause the garage door operator to be actuated. Thus, it is apparent that the system provides high security requiring the entry of a code or access to a secured area. Access is restricted to authorized users by either forcing the user to enter the work light followed by the command keystroke on the interior pad for which one can only obtain access if they have a key to the garage or a transmitter which can open the garage door with an already authorized code. Authorization is provided in the alternative by allowing access through the keypad on the outside of the garage door, but requiring that a code that matches one of the authorization codes already stored in the head unit be entered manually before the system even can accept a learn command. It may be appreciated that although the system may still include a learn button mounted on the head unit as a fail safe for reprogramming of the garage door operator, the ability to reprogram either directly from the RF keypad mounted on the outside of the garage or by using the inside wired control allows rapid and easy reprogramming without subjecting the user to the inconvenience of having to actuate the learn button on the head unit.

It is a principal object of the present invention to provide a code driven apparatus having a secure yet simple system for allowing learning of a code from a radio frequency transmitter.

Other objects of this invention will become obvious to one of ordinary skill in the art upon a perusal of the following specification and claims in light of the accompanying drawings.

DETAILED DESCRIPTION OF THE PREFERRED EMBODIMENT

Figure 1:
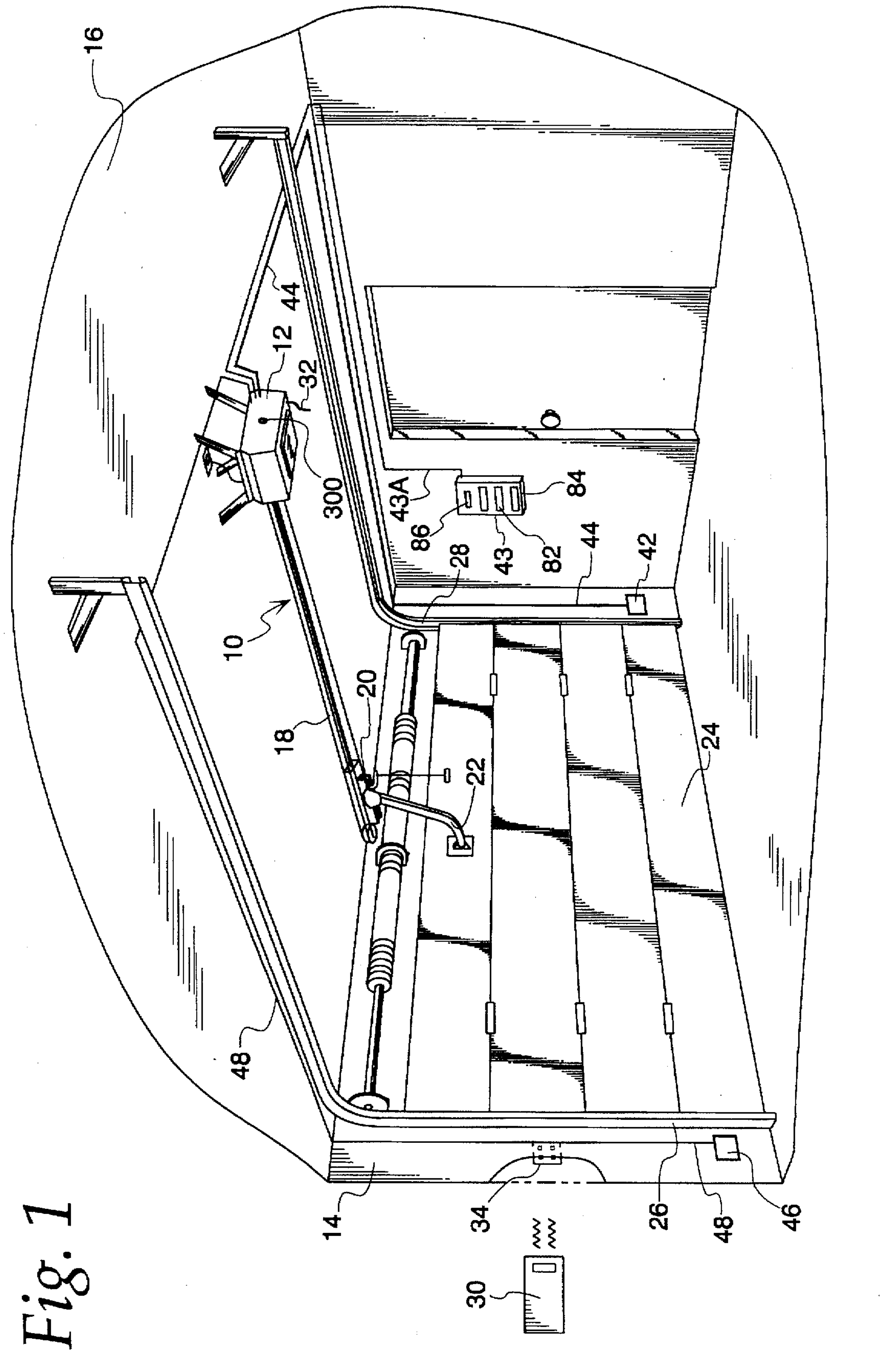
FIG. 1 is a perspective view of an apparatus comprising a garage door operator and embodying the present invention.
Figure 2:
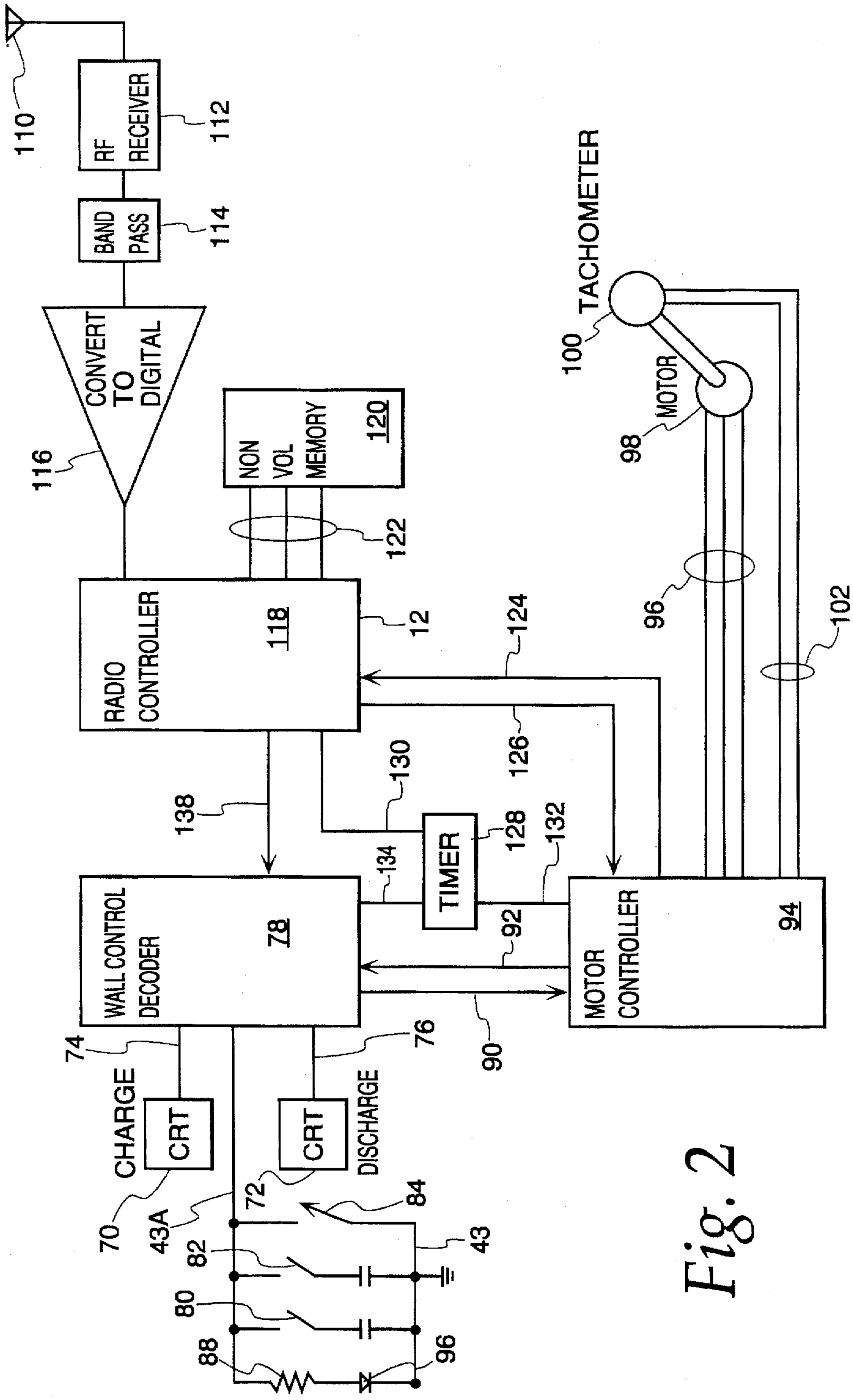
FIG. 2 is a block diagram of a portion of the head unit and associated controls of the apparatus shown in FIG. 2.

Referring now to the drawings and especially to FIG. 1, more specifically a movable barrier door operator or garage door operator is generally shown therein and includes a head unit 12 mounted within a garage 14. More specifically, the head unit 12 is mounted to the ceiling of the garage 14 and includes a rail 18 extending therefrom with a releasable trolley 20 attached having an arm 22 extending to a multiple paneled garage door 24 positioned for movement along a pair of door rails 26 and 28. The system includes a hand-held transmitter unit 30 adapted to send signals to an antenna 32 positioned on the head unit 12 and coupled to a receiver as will appear hereinafter. An external control pad 34 is positioned on the outside of the garage having a plurality of buttons thereon and communicate via radio frequency transmission with the antenna 32 of the head unit 12. An optical emitter 42 is connected via a power and signal line 44 to the head unit. An optical detector 46 is connected via a wire 48 to the head unit 12.

The head unit 12 has a wall control panel 43 connected to it via a wire or line 43*a*. More specifically the wall control panel 43 is connected to a charging circuit 70 and a discharging circuit 72, coupled via respective lines 74 and 76 to a wall control decoder 78. The wall control decoder 78 decodes closures of a lock switch 80, a learn switch 82 and a command switch 84 in the wall circuit. The wall control panel 43 also includes a light emitting diode 86 connected by a resistor 88 to the line 43 and to ground to indicate that the wall control panel 43 is energized by the head unit 12. Switch closures are decoded by the wall decoder 78 which sends signals along lines 90 and 92 to a motor controller 94 coupled via motor control lines 96 to an electric motor 98 positioned within the head unit 12. A tachometer 100 receives a mechanical feed from the motor 98 and provides feedback signals indicative of the motor speed or motion on lines 102 to the motor controller 94.

The receiver unit also includes an antenna 110 coupled to receive radio frequency signals either from the fixed RF keypad 34 or the hand-held transmitter 30. The RF signals are fed to a radio frequency receiver 112 where they are buffer amplified and supplied to a bandpass circuit 114 which outputs low frequency signals in the range of 1 Hz to 1 kHz. The low frequency signals are fed to an analog-to-digital converter 116 that sends digitized code signals to a radio controller 118. The radio controller 118 is also connected to receive signals from a non-volatile memory 120 over a non-volatile memory bus 122 and to communicate via lines 124 and 126 with the motor controller 94. A timer 128 is also provided, coupled via lines 130 with the radio controller, a line 132 with the motor controller and a line 134 with the wall control decoder 78.

Figure 3A:
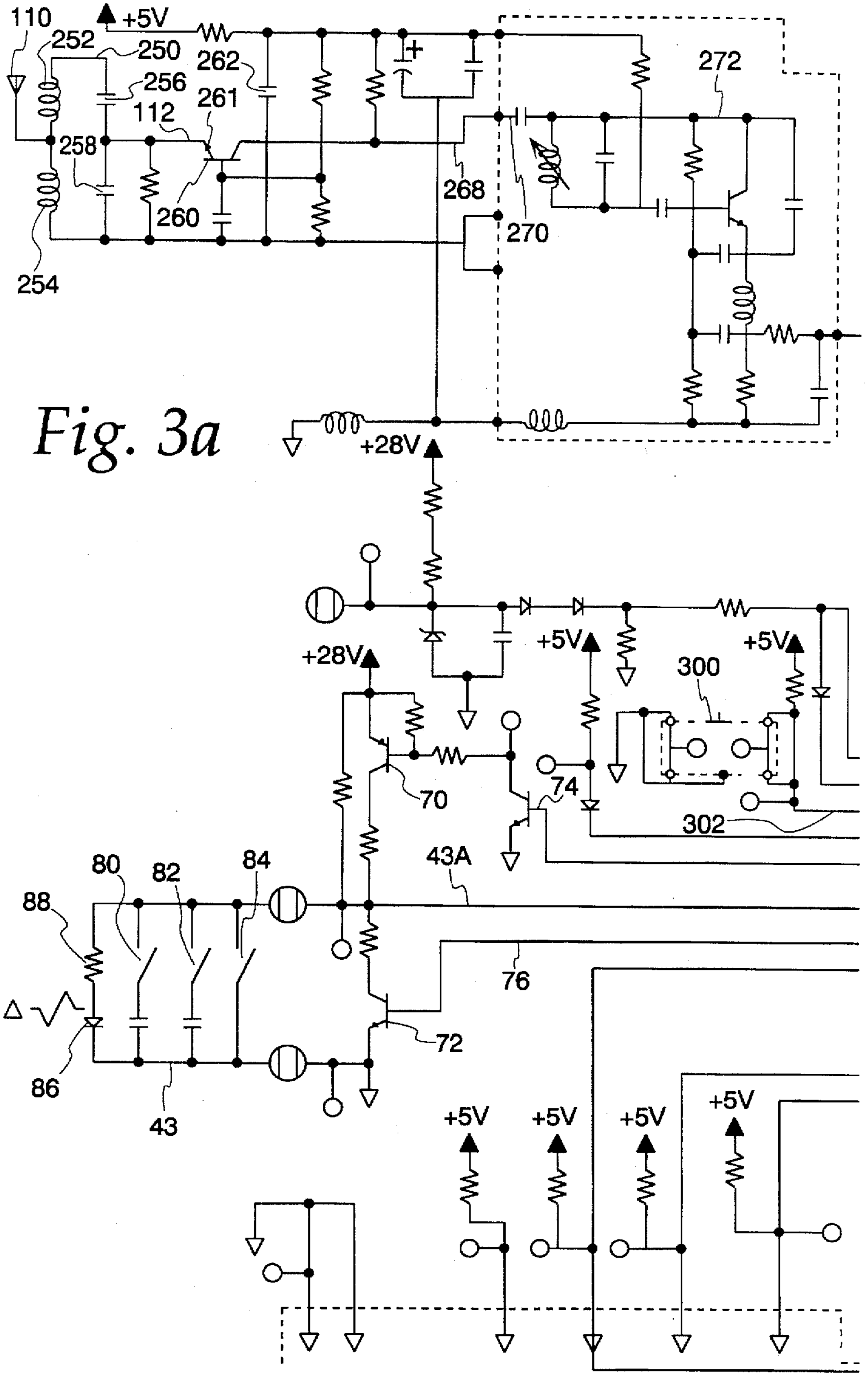
FIG. 3A–C is a schematic diagram showing details of the circuit shown in FIG. 2.
Figure 3B:
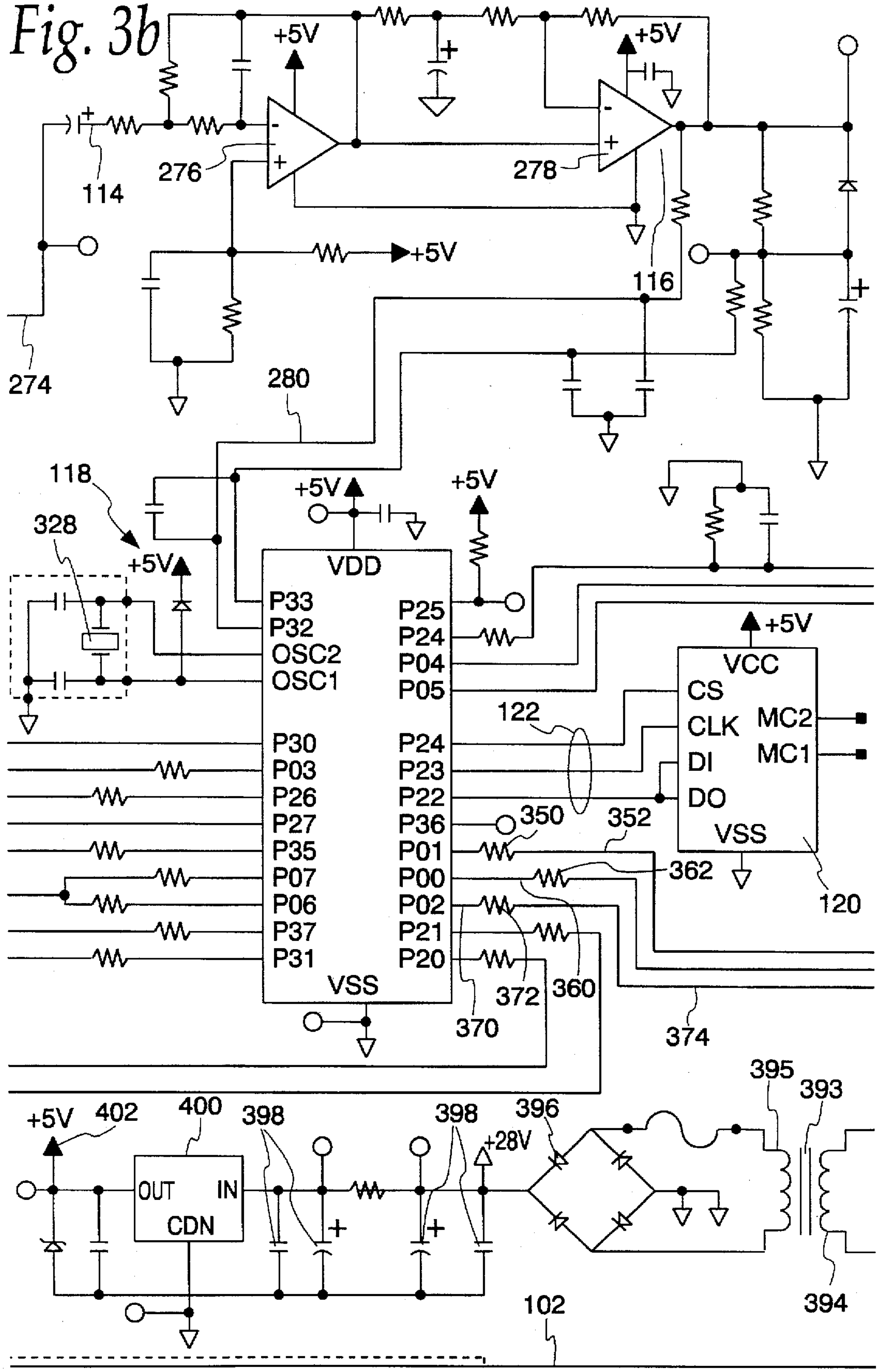
Figure 3C:
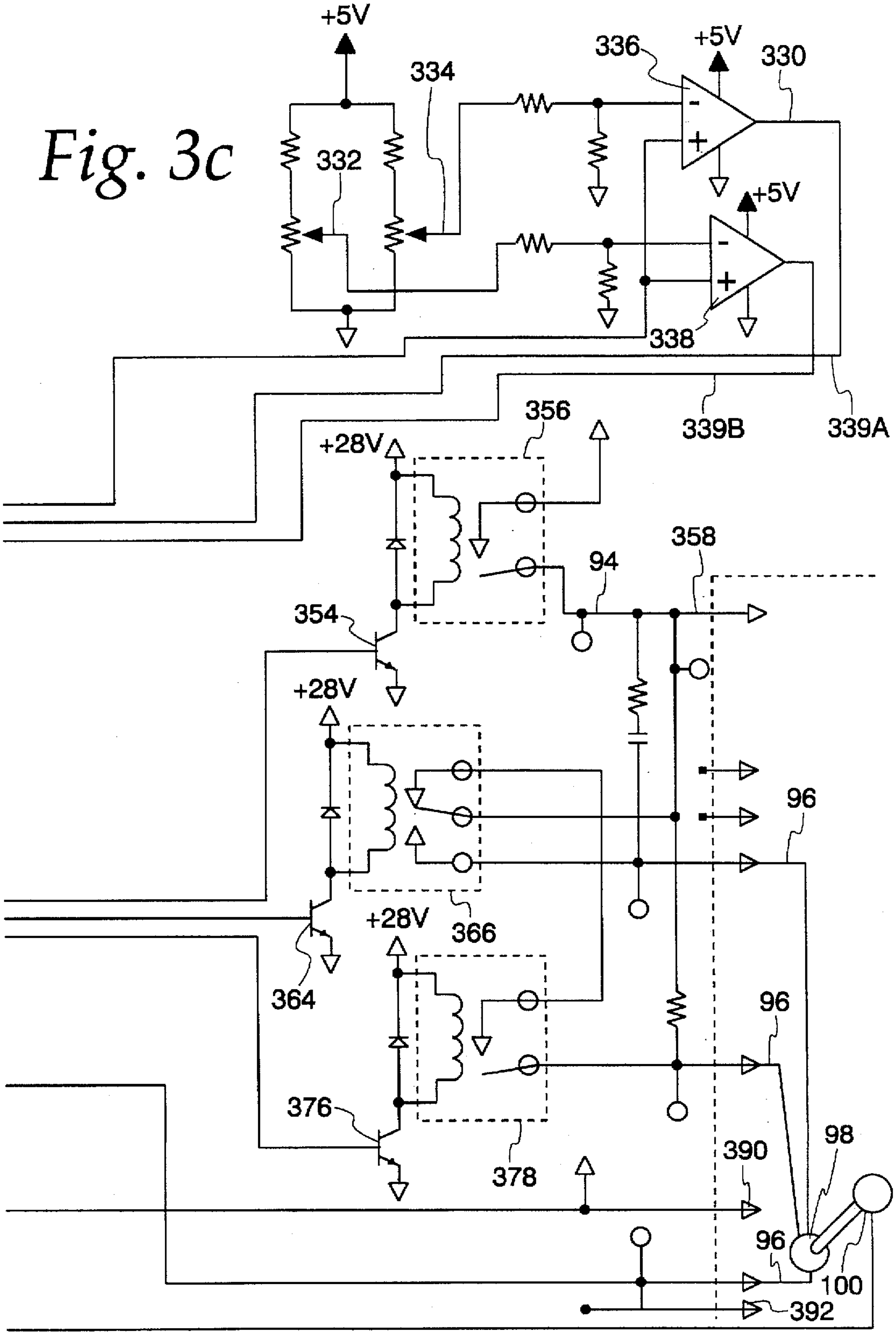

Referring now to FIG. 3A–C, the system shown in FIG. 3A–C is shown therein with the antenna 110 coupled to a reactive divider network 250, comprised of a pair of series connected inductances 252 and 254 and capacitors 256 and 258, which supplies an RF signal to the buffer amplifier 112 having an NPN transistor 260 connected to receive the RF signal at its emitter 261. The NPN transistor 260 has a capacitor 262 connected to it for power supply isolation. The buffer amplifier 112 provides a buffered radio frequency output signal on a lead 268. The buffered RF signal is fed to an input 270 which forms part of a super-regenerative receiver 272 having an output at a line 274 coupled to the bandpass filter 114 which provides output to a comparator 278. The bandpass filter 114 and analog-to-digital converter provide a digital level output signal at a lead 280 which is supplied to an input pin P32 of an 8-bit Zilog microcontroller 282.

The microcontroller 282 may have its mode of operation controlled by a programming or learning switch 300 positioned on the outside of the head unit 12 and coupled via a line 302 to the P26 pin of the microcontroller 282. The wired control panel 43 is connected via the lead 43*a* to input pins P06 and P07. The microcontroller 282 has a 4 MHz crystal 328 connected to it to provide clock signals. A force sensor 330 includes a bridge circuit having a potentiometer 332 for setting the up force and a potentiometer 334 for setting the down force, respectively connected to inverting terminals of a first comparator 336 and a second comparator 338. The comparator 336 sends an up force signal over a line 339*a*. The comparator 338 sends a down force signal over the line 339*b*, respectively to pins P04 and P05 of the 8-bit microcontroller 282. Although details of the operation of the microcontroller in conjunction with other portions of the circuit will be discussed hereinafter, it should be appreciated that the P01 pin of the microcontroller is connected via a resistor 350 to a line 352 which is coupled to an NPN transistor 354 that controls a light relay 356 which may supply current via a lead 358 to a light in the head unit or the like. Similarly, the pin P000 feeds an output signal on a line 360 to a resistor 362 which biases a base of an NPN transistor 364 to cause the transistor 364 to conduct, drawing current through the coil of the relay an up relay 366 causing an up motor command to be sent over a line 96 to the motor 98. Finally, the P02 pin sends a signal through a line 370 to a resistor 372 via a line 374 to the base of an NPN transistor 376 connected to control current through a coil of a down control relay 378 which is coupled by one of the leads to the motor 98 to control motion of the motor 98.

Electric power is received on a hot AC line 390 and a neutral line AC line 392 which are coupled to a transformer 393 at its primary winding 394. The AC is stepped down at a secondary winding 395 and is full wave rectified by a full wave rectifier 396. It may be appreciated that, in the alternative, a half wave rectifier may also be used.

A plurality of filter capacitors 398 receive the full wave rectified fluctuating voltage and remove some transients from the voltage supplying a voltage with reduced fluctuation to an input of a voltage regulator 400. The voltage regulator 400 produces a 5-volt output signal available at a lead 402 for use in other portions of the circuit.

Figure 4:
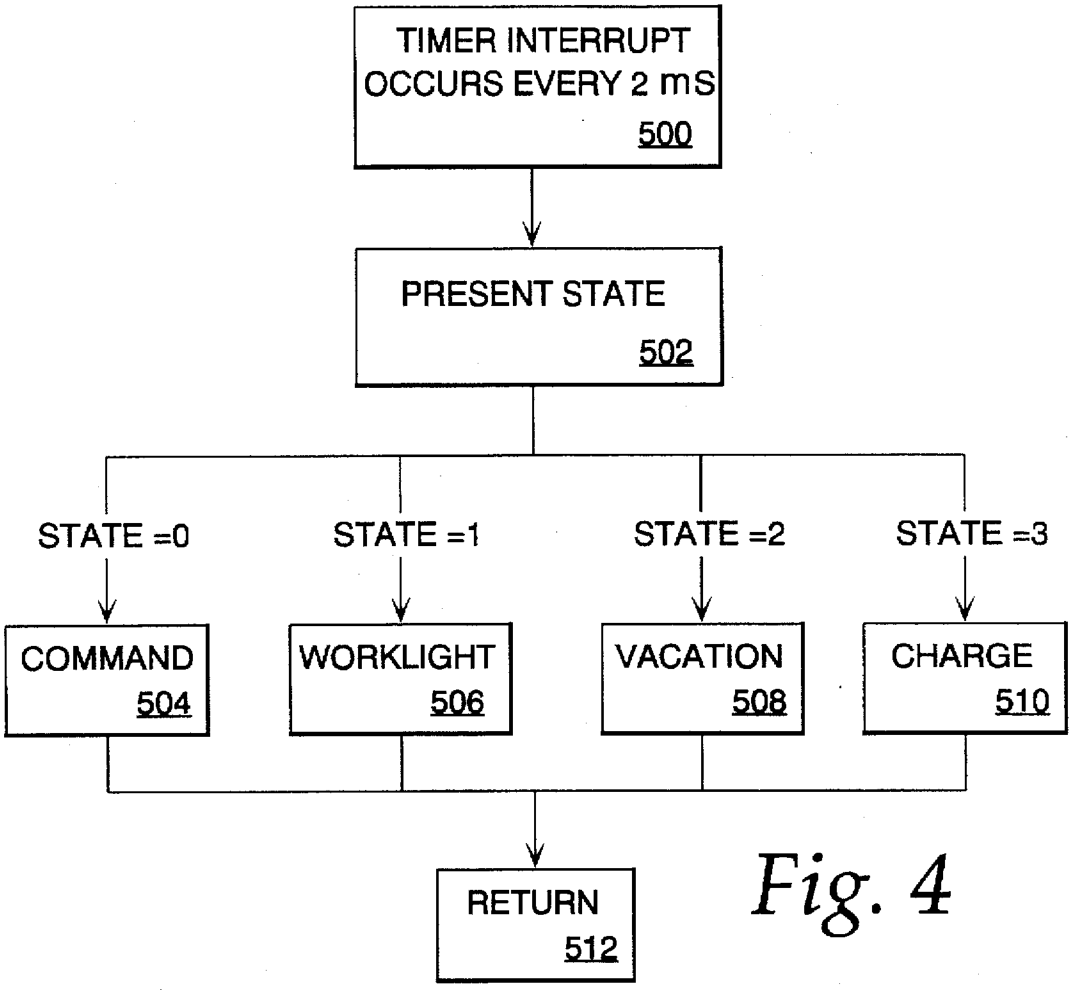
FIG. 4 is a top level flow chart showing details of the execution of program code in the microcontroller shown in FIG. 3.

Referring now to FIG. 4, the top level program flow for execution of a portion of the program on the microcontroller 282 is shown therein. A timer interrupt is generated every 2 milliseconds and then when that occurs in a step 500, the present state of the program is checked in the step 502. If the state is zero, control is transferred to a command module. If the state is 1, control is transferred to a work light module in the step 506. Control is transferred in a step 508 to a vacation switch routine if the state is 2 and if the state is 3, control is transferred to a switch charging routine in a step 510. Once each of those routines are ended, a step 512 is entered indicating a return to other portions of the program until the timer interrupt again occurs. Thus, the top level program flow is similar to a realtime controller flow in that periodically, as the state changes, the command, work light, vacation and charge routines are entered.

Figure 5:
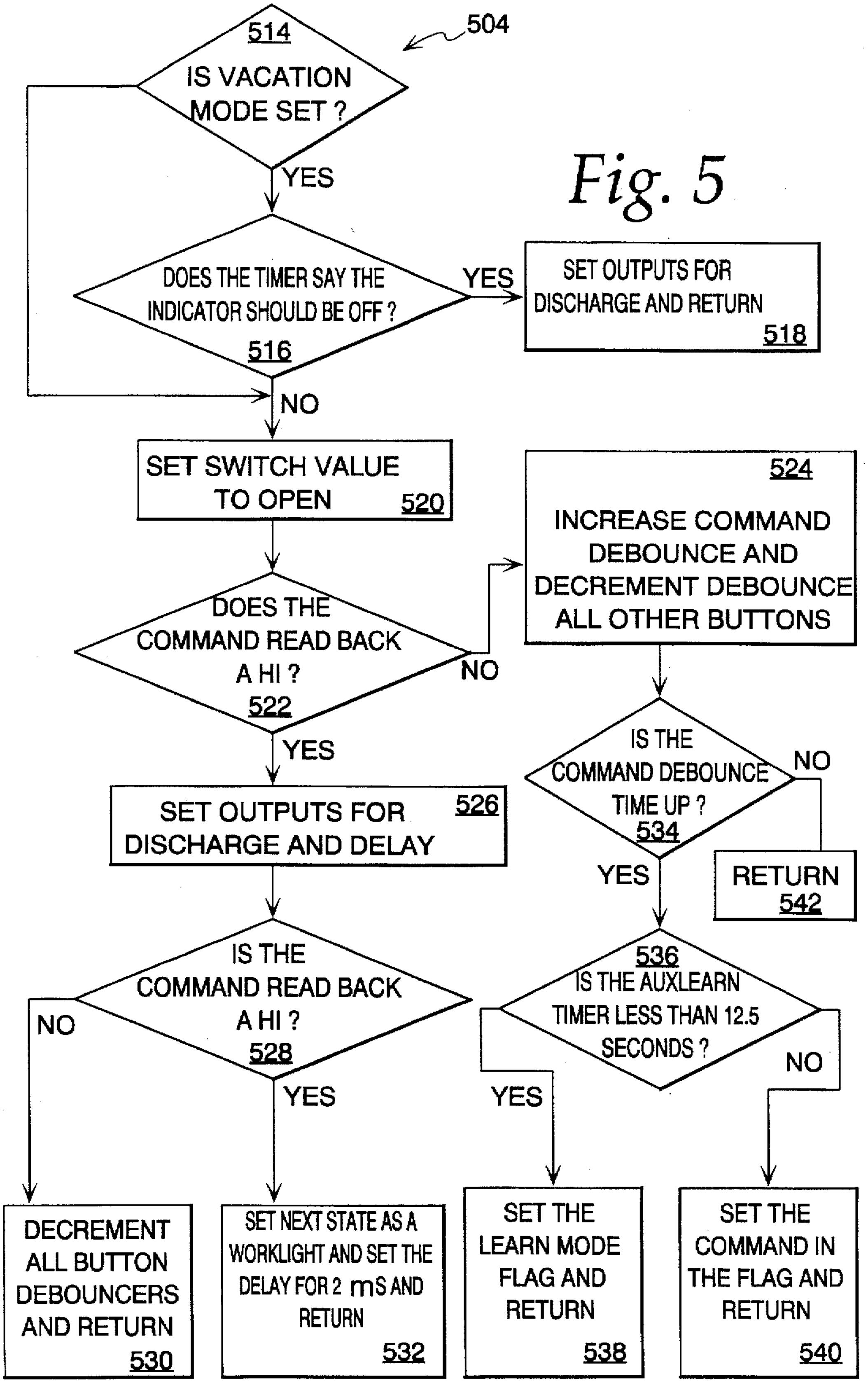
FIG. 5 is a flow chart describing the operation of a command switch and learn switch interrogation.

Referring now to FIG. 5, the command routine 504 is set forth therein. In a step 514, a test is made to see if the vacation mode has been set in the microcontroller. If it has been, a test is made in step 516 to determine whether the timer includes an operand indicating that the indicator should be off. If so, control is transferred to a step 518 where outputs are set for switch discharge and return. If not, control is transferred to a step 520 where the switch value is set to open. Also, in the event that the step 514 test indicates that the vacation mode has not been set, control is directly transferred to the step 520. Following switch setting in the step 520, a test is made in a step 522 to determine whether the command reads back a high signal. If it does not, the command debounces increase and the debounce for all other button pushes is decremented in a step 524. In the event that the command read back is high, control is transferred to a step 526 where outputs are set for discharge and delay. In a step 528, a test is again made to determine whether the command read back is a high. If it is, control is transferred to a step 532 where the next state signal is set equal to one indicating the work light and a delay is set for 2 milliseconds following which control is transferred back to step 512. In the event the command read back is not high in step 528, control is transferred to a step 530 where all button debounces are decremented and control is transferred back to the return step 512. In the event that step 524 has been executed, control is transferred to a step 534 testing whether the command debounce time has expired. If it has, control is transferred to a step 536 where the auxiliary learn timer is tested to see whether it contains a stored value of less than 12½ seconds. If it does, control is transferred to a step 538 where the learn mode flag is set and the routine is exited to the return step 512. If the auxiliary learn timer is greater than 12½ seconds, control is transferred to step 540 to set the command in the flag and control is transferred back to the return step 512.

Figure 6:
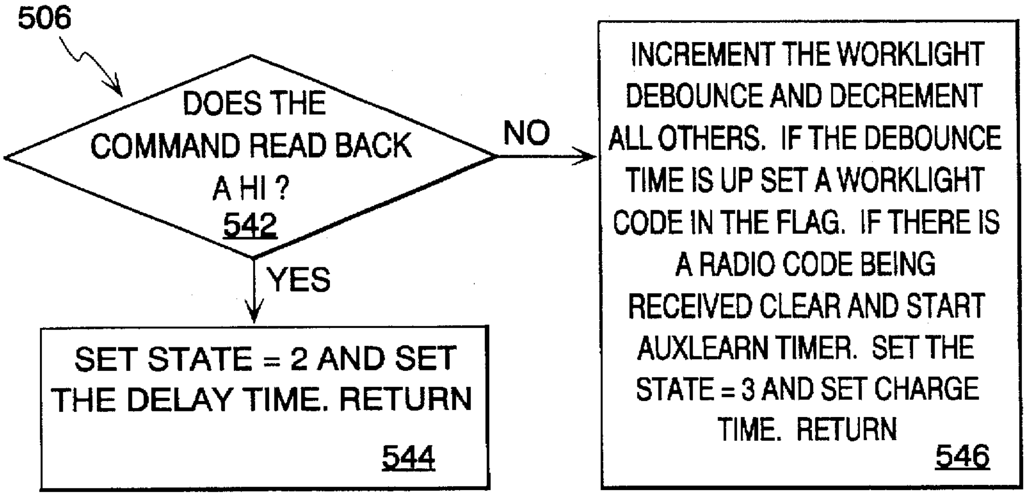
FIG. 6 is a flow chart of a command state and a worklight state examination routine.

Referring now to FIG. 6, the work light routine 506 is set forth therein. The initial step is a decision step 542 where a test is made to determine whether the command read back is a high signal. If it is, control is transferred to the step 544 where the state is set equal to 2 and the delay time is set followed by control being transferred to the return step 512. If the command read back signal is not high, a step 546 is entered wherein the work light is incremented. All other debounce signals are decremented. If the debounce time has expired for the work light, a work light code flag is set. A test is made to determine whether a radio code is being received clearly, and if it is, the auxiliary learn timer is started, followed by the state signal being set equal to 3 indicative of entry of the charge routine 510 thereafter, and the charge time is set followed by a return.

Figure 7:
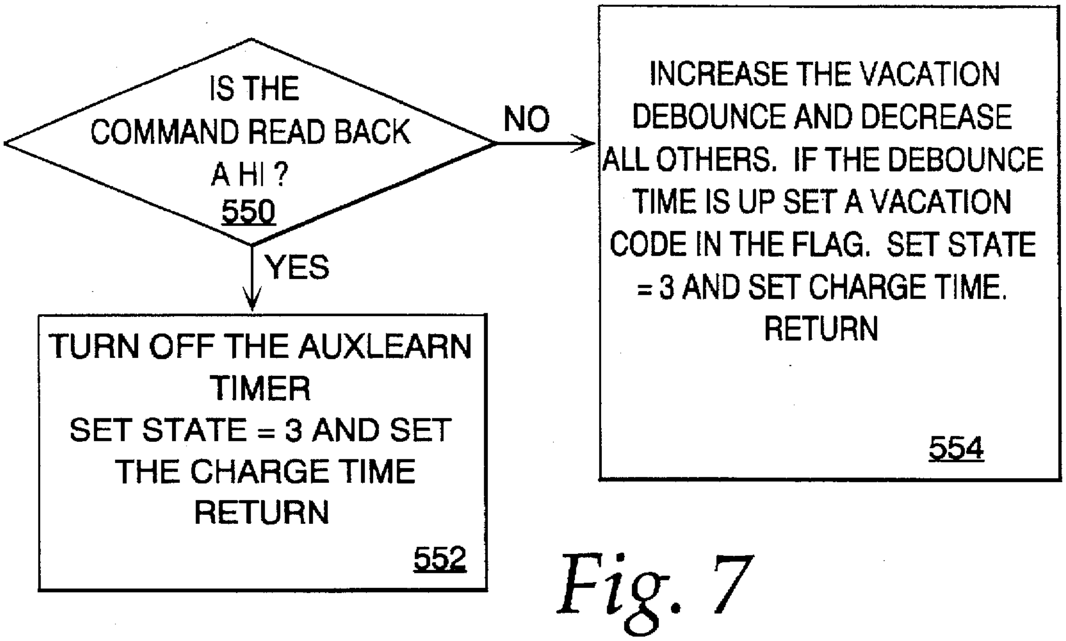
FIG. 7 is a flow chart of a vacation switch routine.
Figure 8:
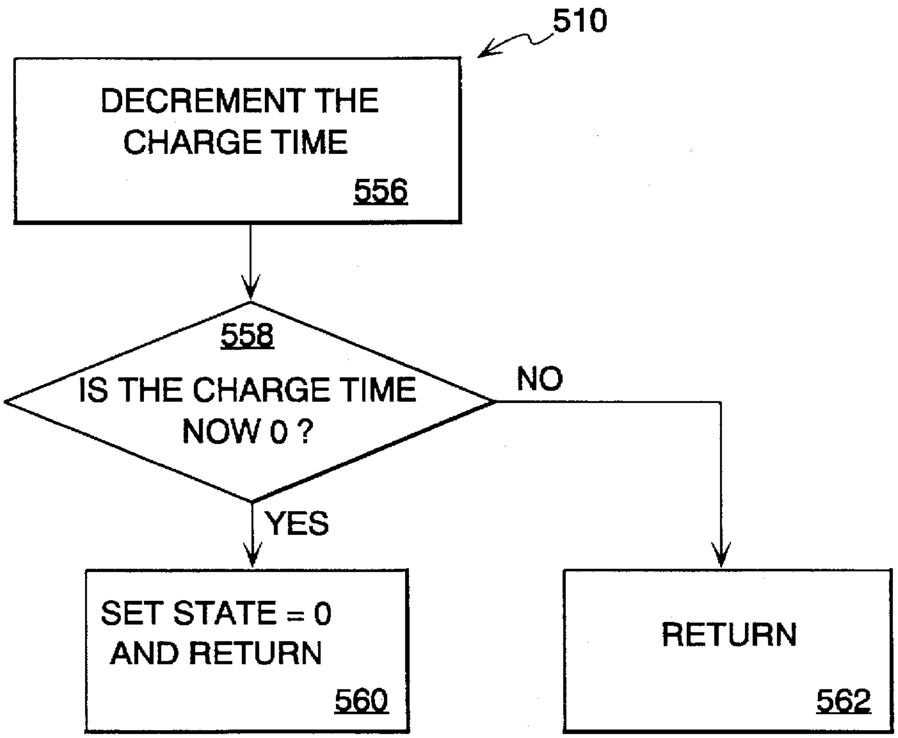
FIG. 8 is a flow chart of a switch charge routine.

In the event that the vacation mode routine 508 is entered, that routine is set forth in FIG. 7. In a step 550, a test is made to determine whether the command read back is a high. If it is, control is transferred to a step 552 in which the auxiliary learn timer is switched off. The state is set equal to 3, indicative of entry of the charging routine and the charge time is set followed by a return indicating a transfer back to the return step 512. If the command read back is not high, control is transferred to a step 554 in which the vacation debounce time is increased and all other button debounce times are decreased. If the vacation debounce time is expired, the vacation code flag is set, the set equal to 3 and the charge time is set to enter the charging routine.

In the event that the charging routine 510 is entered, the charge time is decremented in a step 556 followed by a step 558 in which the charge time is tested for whether it is equal to zero. If the charging time is zero, indicating it has expired, control is transferred to a step 560 setting the state to zero, indicating the command routine is to be entered next followed by a return. In the event that the charge time is not zero, a return step 562 is entered.

Figure 9A:
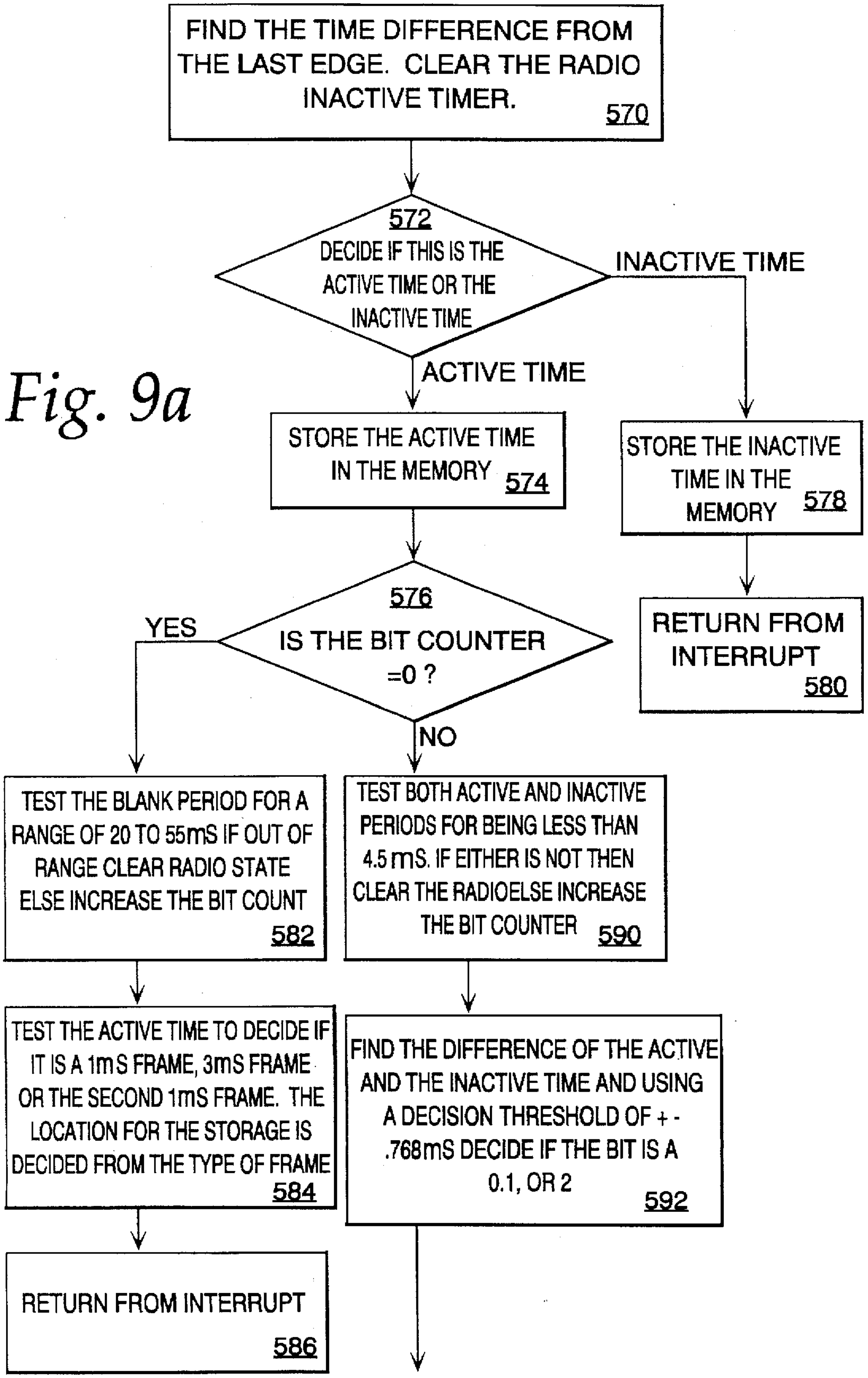
FIGS. 9A–C are a flow chart of a code learning or storage routine.
Figure 9B:
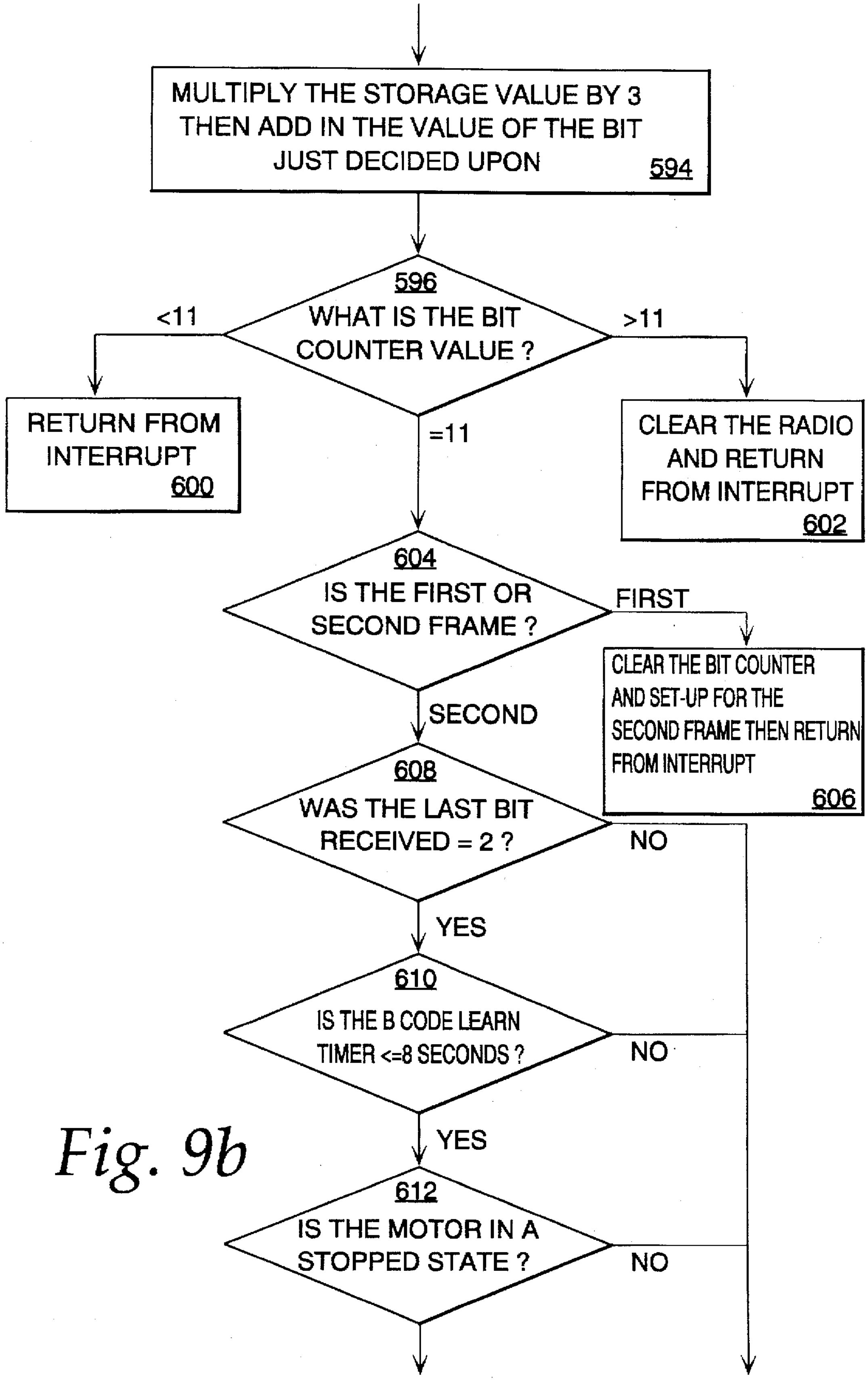
Figure 9C:
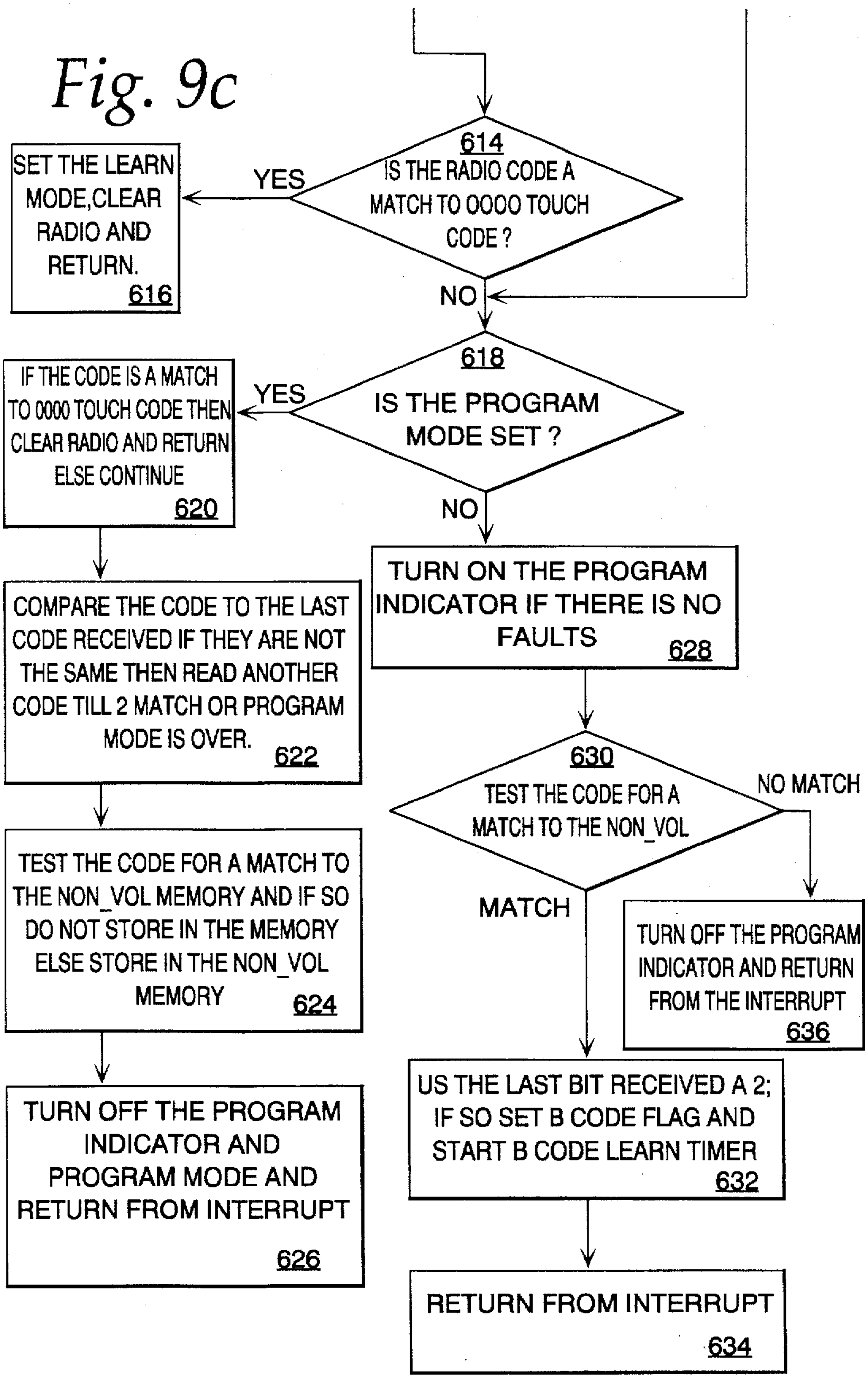

In addition to the four routines set forth in FIG. 4, a radio testing routine and learning routine is set forth in FIGS. 9*a* through 9*c*. A step 570 is entered, where a time difference determination is made between the last edge of a coded signal having been received from a transmission and the radio inactive timer is cleared. A decision step 572 is then entered to determine if it is an active time state or an inactive time state. In the event that it is an active time state, control is transferred to a step 574 causing the active time to be stored in the memory. The bit counter is tested to determine whether it equals zero in the step 576. In the event that the decision step 572 indicates that it is an inactive time, control is transferred to a step 578, storing the inactive time in the memory and a return is executed in a step 580. In the event that the bit counter tested for in step 576 is equal to zero, control is transferred to a step 582 testing the blank period in the radio signal to determine if it is in the range of 20 milliseconds to 55 milliseconds. If the blank or lack of radio signal period is outside of that range, the radio state is cleared. In the event that it is inside the range, the bit counter is increased by one. Control is then transferred to a step 584 where the active time is tested to determine if it is a 1 millisecond, 3 millisecond or the second 1 millisecond frame. The location for the storage is then determined from the frame typing and control is transferred to a step 586 where a return is executed from the interrupt. In the event that the bit counter is not zero in step 576, control is transferred to the step 590 to test both the active and inactive time periods to determine whether they are less than 5 milliseconds. If either is not less than 4.5 milliseconds, then the radio state is cleared. If not, the bit counter is incremented. Control is then transferred to a step 582 to determine the difference between the active and inactive times. A decision threshold of ±0.768 milliseconds is then employed to determine if a bit is equal to zero, one or two, which is a determination as to what the state is of a particular trinary bit or three-state bit having been received by the radio signal.

Having determined the state of the trinary bit, control is transferred to a step 594 where the storage value is multiplied by three, in effect by doing a shift and the value of the trinary bit established in step 592 is then added. Control is transferred to a step 596 to determine the bit counter value. If it is less than 11, control is transferred to a step 600 and the interrupt is returned from. If it is greater than 11, control is transferred to a step 602 in which the radio is cleared and the interrupt is returned from. If the bit value counter is equal to 11, control is transferred to a step 604 where there is a test made to determine whether the sink pulse having come in is indicative of a first or second frame. If it is indicative of a first frame, control is transferred to a step 606 where the bit counter is cleared an a set up is done for the second frame, following which there is a return from the interrupt. If the step 604 indicates that it is a second frame coming in, control is transferred to a step 608 where a test is made to determine whether the last trinary bit received was equal to 2. If it is not, control is transferred to a step 618. If it is equal to 2, control is transferred to a decision block 610 where the B code learn timer is tested to determine whether it is less than or equal to 8 seconds. If it is not, control is transferred to the step 618. If it is, control is transferred to a test or decision step 612 to determine whether the electric motor 98, as indicated by the tachometer 100, is stopped. If the electric motor is stopped, control is then transferred to a step 614 where a test is made to determine whether the radio code is a match, and to determine whether a 000 code has been entered, indicative of the fact that the keypad is instructing the system to go into a learn mode. If step 614 tests yes, the control is transferred to a step 616 in which the new code is stored, the learn mode is set, the radio is cleared and a return is set to the step 512. If the step 614 tests negatively, control is transferred to the step 618 to determine whether the programming mode has been set by the programming switch 300. If it has, step 620 is entered, the code is tested for a match to the 000 touch code, the radio is cleared and the interrupt routine is exited or returned from. If not, control is transferred to the step 622 where the code is compared to the last code received. If they are not the same, then another code is read until two successive code frames match or the programming mode has expired. Control is then transferred to a step 624 where the code is tested for a match with code stored in non-volatile memory and, if it does match, no storage takes place. If it does not match, the new code is stored in the non-volatile memory. Control is then transferred to the step 626 where the program indicator is turned off and the program mode is exited and there is a return from the interrupt. In the event that the test in step 618 is negative, control is transferred to a step 628 to turn on the program indicator if there are no faults. Control is then transferred to a decision step 630 to test the code for a match with code stored in the non-volatile memory. If there is a match, control is transferred to the step 632 to determine whether the last trinary bit received is equal to a 2. If it is, a B code flag is set and the B code learn timer is started following which step 634 is entered and there is a return from the interrupt. In the event that there is no match found in the decision step 630, the program indicator is switched off and the interrupt routine is exited to return to step 512.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

```
;---------------------------------------------------------------------
;       NON-VOL MEMORY MAP
;---------------------------------------------------------------------
;
;       00      A1
;       01      A1
;       02      A2
;       03      A2
;       04      A3
;       05      A3
;       06      A4
;       07      A4
;       08      A5
;       09      A5
;       0A      A6
;       0B      A6
;       0C      A7
;       0D      A7
;       0E      A8
;       0F      A8
;       10      A9
;       11      A9
;       12      A10
;       13      A10
;       14      A11
;       15      A11
;       16      A12
;       17      A12
;       18      B
;       19      B
;       1A      C
;       1B      C
;       1C      CYCLE COUNTER 1ST 16 BITS
;       1D      CYCLE COUNTER 2ND 16 BITS
;       1E      VACATION FLAG
;       1F      A MEMORY ADDRESS LAST WRITTEN
;
;
```

A-1

```
;       20-2F   OPERATION BACK TRACK
;       30-3F   FORCE BACK TRACE
;
;
;-----------------------------------------------------------------------------
;       RS232 DATA
;-----------------------------------------------------------------------------
;
;       INPUT           OUTPUT
;
;       30H             SWITCH STATUS
;                       XXXXXXX0        UP LIMIT OPEN
;                       XXXXXXX1        UP LIMIT CLOSED
;                       XXXXXX0X        DOWN LIMIT OPEN
;                       XXXXXX1X        DOWN LIMIT CLOSED
;                       XXXXX0XX        COMMAND OPEN
;                       XXXXX1XX        COMMAND CLOSED
;                       XXXX0XXX        WORKLIGHT OPEN
;                       XXXX1XXX        WORKLIGHT CLOSED
;                       XXX0XXXX        VACATION OPEN
;                       XXX1XXXX        VACATION CLOSED
;
;       31H             SYSTEM STATUS
;                       XXXXSSSS        STATE DATA
;                       XXX0XXXX        NOT IN LEARN MODE
;                       XXX1XXXX        IN LEARN MODE
;                       XX0XXXXX        NOT IN VACATION MODE
;                       XX1XXXXX        IN VACATION MODE
;                       X0XXXXXX        LIGHT OFF
;                       X1XXXXXX        LIGHT ON
;                       0XXXXXXX        AOBS OK
;                       1XXXXXXX        AOBS ERROR
;
;       32H             RPM PERIOD
;                       RETURNED HIGH BYTE
;                       RETURNED LOW BYTE
;
;       33H             FORCE
;                       RETURNED DOWN FORCE
;                       RETURNED UP FORCE
;
;       34H             RADIO MEMORY CODES PAGE 00
;                       32 BYTES
;
;       35H             RADIO MEMORY CODES PAGE 10
;                       32 BYTES
;
;       36H             OPERATION HISTORY PAGE 20
;                       32 BYTES
;
;       37H             FORCE HISTORY PAGE 30
;
;       38H             MEMORY TEST AND ERASE ALL!!
;                       00 OK
```

```
;                   FF ERROR
;
;       39H         SET PROGRAM MODE
;
;
;       REASON
;       00      COMMAND
;       10      RADIO COMMAND
;       20      FORCE
;       30      AUX OBS
;       40      A REVERSE DELAY
;       50      LIMIT
;       60      EARLY LIMIT
;       70      MOTOR MAX TIME, TIME OUT
;       80      MOTOR COMMANDED OFF RPM CAUSING AREV
;       90      DOWN LIMIT WITH COMMAND HELD
;       A0      DOWN LIMIT WITH THE RADIO HELD
;       B0      RELEASE OF COMMAND OR RADIO AFTER A FORCED
;               UP MOTOR ON DUE TO RPM PULSE WITHG MOTOR OFF
;
;
;       STATE
;
;       00      AUTOREVERSE DELAY
;       01      TRAVELING UP DIRECTION
;       02      AT THE UP LIMIT AND STOPED
;       03      ERROR RESET
;       04      TRAVELING DOWN DIRECTION
;       05      AT THE DOWN LIMIT
;       06      STOPPED IN MID TRAVEL
;
;
;----------------------------------------------------------------------
;       DIAG
;----------------------------------------------------------------------
;
;       1) AOBS SHORTED
;       2) AOBS OPEN / MISS ALIGNED
;       3) COMMAND SHORTED
;       4) PROTECTOR INTERMITTENENT
;       5) CALL DEALER
;               A) NO RPM IN THE FIRST SECOND
;               B) RPM FORCED A REVERSE
;               C)
;
;
;
;----------------------------------------------------------------------
;       DOG 2
;----------------------------------------------------------------------
;
;       DOG 2 IS A SECONDARY WATCHDOG USED TO
;       RESET THE SYSTEM IF THE LOWEST LEVEL "MAINLOOP"
;       IS NOT REACHED WITHIN A 3 SECOND
;
;----------------------------------------------------------------------
```

```
;        EQUATE STATEMENTS
;--------------------------------------------------------------------------

check_sum_value     .equ   09BH
TIMER_0             .EQU   10H
TIMER_0_EN          .EQU   03H
TIMER_1_EN          .EQU   0CH

MOTOR_HI            .EQU   034H
MOTOR_LO            .EQU   0BCH
PWM_CHARGE          .EQU   00H
PWM_DISCHARGE       .EQU   01H
LIGHT               .EQU   0FFH
LIGHT_ON            .EQU   02H
MOTOR_UP            .EQU   01H
MOTOR_DN            .EQU   04H
DN_LIMIT            .EQU   02H
UP_LIMIT            .EQU   01H
DIS_SW              .EQU   10000000B
CDIS_SW             .EQU   01111111B
SWITCHES            .EQU   01000000B
CHARGE_SW           .EQU   00100000B
CCHARGE_SW          .EQU   11011111B
PWM_HI              .EQU   10H
COMPARATORS         .EQU   30H
DOWN_COMP           .EQU   20H
UP_COMP             .EQU   10H
PWM_DIS             .EQU   20H
P01M_INIT           .EQU   01000100B    ; set mode p00-p03 out p04-p07in
P2M_INIT            .EQU   01100011B
P3M_INIT            .EQU   00000011B    ; set port3 p30-p33 input ANALOG mode
P01S_INIT           .EQU   00000010B
P2S_INIT            .EQU   10000011B
P3S_INIT            .EQU   00000000B

FLASH               .EQU   0FFH
WORKLIGHT           .EQU   02H

COM_CHARGE          .EQU   2
WORK_CHARGE         .EQU   20
VAC_CHARGE          .EQU   80

COM_DIS             .EQU   01
WORK_DIS            .EQU   04
VAC_DIS             .EQU   24

CMD_TEST            .EQU   00
WL_TEST             .EQU   01
VAC_TEST            .EQU   02
CHARGE              .EQU   03

AUTO_REV            .EQU   00H
UP_DIRECTION        .EQU   01H
UP_POSITION         .EQU   02H
DN_DIRECTION        .EQU   04H
```

A-4

```
DN_POSITION       .EQU  05H
STOP              .EQU  06H
CMD_SW            .EQU  01H
LIGHT_SW          .EQU  02H
VAC_SW            .EQU  04H

;---------------------------------------------------------------------------
;       PERIODS
;---------------------------------------------------------------------------

LIMIT_COUNT       .EQU  0FH                 ; limit debounce 1 way 32mS
AUTO_HI           .EQU  00H                 ; auto rev timer .5 sec
AUTO_LO           .EQU  0F4H
MIN_COUNT         .EQU  04H                 ; pwm start point
TOTAL_PWM_COUNT   .EQU  03FH                ; pwm end = start + 4*total-1
FLASH_HI          .EQU  00H                 ; .25 sec flash
FLASH_LO          .EQU  07AH
SET_TIME_HI       .EQU  02H           ; 4.5 MIN
SET_TIME_LO       .EQU  02H           ; 4.5 MIN
SET_TIME_PRE      .EQU  0FBH          ; 4.5 MIN
ONE_SEC           .EQU  0F4H          ; WITH A /2 IN FRONT
CMD_MAKE          .EQU  8D                  ; cycle count *10mS
CMD_BREAK         .EQU  (255D-8D)
LIGHT_MAKE        .EQU  8D                  ; cycle count *11mS
LIGHT_BREAK       .EQU  (255D-8D)
VAC_MAKE_OUT      .EQU  4D                  ; cycle count *100mS
VAC_BREAK_OUT     .EQU  (255D-4D)
VAC_MAKE_IN       .EQU  2D
VAC_BREAK_IN      .EQU  (255D-2D)

VAC_DEL           .EQU  8D
CMD_DEL_EX        .EQU  4D
VAC_DEL_EX        .EQU  50D

;***************************************************************************
;       PREDEFINED REG
;***************************************************************************

;SP       .equu 255       ; stack pointer
;RP       .equ  253       ; register pointer
;FLAGS    .equ  252       ; cpu flags
;IMR      .equ  251       ; interrupt mask reg
;IRQ      .equ  250       ; interrupt request
;IPR      .equ  249       ; interrupt priority
;P01M     .equ  248       ; port 0 mode
;P3M      .equ  247       ; port 3 mode
;P2M      .equ  246       ; port 2 mode
;PRE0     .equ  245       ; prescaler for timer 0
;T0       .equ  244       ; timer 0
;PRE1     .equ  243       ; prescaler for timer 1
;T1       .equ  242       ; timer 1
;TMR      .equ  241       ; timer mode
;P3       .equ  3         ; port 3
```

A-5

```
:P2            .equ   2           ; port 2
;P0            .equ   0           ; port 0

ALL_ON_IMR  .equ   00111101b   ; turn on  int for timers rpm auxobs radio
RETURN_IMR  .equ   00011101b   ; return on the IMR
;---------------------------------------------------------------------------
;       GLOBAL REGISTERS
;---------------------------------------------------------------------------

STATUS              .EQU   04H    ; CMD_TEST 00
                                  ; WL_TEST  01
                                  ; VAC_TEST 02
                                  ; CHARGE 03

STATE               .EQU   05H    ; state register
PWM_STATUS          .EQU   06H
PWM_OFF             .EQU   07H
AUTO_DELAY_HI       .EQU   08H
AUTO_DELAY_LO       .EQU   09H
AUTO_DELAY          .EQU   08H
MOTOR_TIMER_HI      .EQU   0AH
MOTOR_TIMER_LO      .EQU   0BH
MOTOR_TIMER         .EQU   0AH
LIGHT_TIMER_HI      .EQU   0CH
LIGHT_TIMER_LO      .EQU   0DH
LIGHT_TIMER         .EQU   0CH

PRE_LIGHT           .EQU   0FH
SW_DATA             .EQU   10H
ONEP2               .EQU   11H          ; 1.2 SEC TIMER TICK .125
LAST_CMD            .EQU   12H          ; LAST COMMAND FROM
                                        ; = 55 WALL CONTROL
                                        ; = 00 RADIO
BCODEFLAG           .EQU   13H          ; B CODE FLAG
                                        ; 77 = b code
RPMONES             .EQU   14H          ; RPM PULSE ONE SECOND DISABLE
RPMCLEAR            .EQU   15H          ; RPM PULSE CLEAR AND TEST TIMER
FAREVFLAG           .EQU   16H          ; RPM FORCED AREV FLAG
                                        ; 88H FOR A FORCED REVERSE

FLASH_FLAG          .EQU   17H
FLASH_DELAY_HI      .EQU   18H
FLASH_DELAY_LO      .EQU   19H
FLASH_DELAY         .EQU   18H
FLASH_COUNTER       .EQU   1AH
REASON              .EQU   1BH          ;
                                        ; 00     COMMAND
                                        ; 10     RADIO COMMAND
                                        ; 20     FORCE
                                        ; 30     AUXOBS
                                        ; 40     AUTOREVERSE DELAY TIMEOUT
                                        ; 50     LIMIT
                                        ; 60     EARLY LIMIT
                                        ; 70     MOTOR MAX TIME OUT
                                        ; 80     FORCED AREV FROM RPM
                                        ; 90     CLOSED WITH COMMAND HELD
```

```
                                        ; A0    CLOSED WITH THE RADIO HELD
LIGHT_FLAG          .EQU   1CH
CMD_DEB             .EQU   1DH
LIGHT_DEB           .EQU   1EH
VAC_DEB             .EQU   1FH


TIMER_GROUP         .EQU   20H
sw_address_hi       .equ   r0
sw_address_lo       .equ   r1
sw_address          .equ   rr0
t_address_hi        .equ   r2
t_address_lo        .equ   r3
t_address           .equ   rr2
switch_delay        .equ   r4
limit               .equ   r5
obs_count           .equ   r6
rs232do             .equ   r7
rs232di             .equ   r8
rscommand           .equ   r9
rs232docount        .equ   r10
rs232dicount        .equ   r11
rs232odelay         .equ   r12
rs232idelay         .equ   r13
rs232ccount         .equ   r14
rs232page           .equ   r15

SWITCH_DELAY        .EQU   TIMER_GROUP+4
LIMIT               .EQU   TIMER_GROUP+5
OBS_COUNT           .EQU   TIMER_GROUP+6
RS232DO             .EQU   TIMER_GROUP+7
RS232DI             .EQU   TIMER_GROUP+8
RSCOMMAND           .EQU   TIMER_GROUP+9
RS232DOCOUNT        .EQU   TIMER_GROUP+10
RS232DICOUNT        .EQU   TIMER_GROUP+11
RS232ODELAY         .EQU   TIMER_GROUP+12
RS232IDELAY         .EQU   TIMER_GROUP+13
RS232CCOUNT         .EQU   TIMER_GROUP+14
RS232PAGE           .EQU   TIMER_GROUP+15

;*********************************************************************
; LEARN EE GROUP FOR LOOPS ECT
;*********************************************************************
LEARNEE_GRP         .equ   30H              ;
TEMPH        .equ   LEARNEE_GRP             ;
TEMPL        .equ   LEARNEE_GRP+1           ;
TEMP         .equ   LEARNEE_GRP+2           ;
LEARNDB      .equ   LEARNEE_GRP+3           ; learn debouncer
LEARNT       .equ   LEARNEE_GRP+4           ; learn timer
ERASET       .equ   LEARNEE_GRP+5           ; erase timer
MTEMPH       .equ   LEARNEE_GRP+6           ; memory temp
MTEMPL       .equ   LEARNEE_GRP+7           ; memory temp
MTEMP        .equ   LEARNEE_GRP+8           ; memory temp
SERIAL       .equ   LEARNEE_GRP+9           ; serial data to and from nonvol memory
ADDRESS      .equ   LEARNEE_GRP+10          ; address for the serial nonvol memory
```

```
T0EXT       .equ   LEARNEE_GRP+11    ; timer 0 extend decremented every T0 int
T4MS        .equ   LEARNEE_GRP+12    ; 4 mS counter
T125MS      .equ   LEARNEE_GRP+13    ; 125mS counter
ZZWIN       .equ   LEARNEE_GRP+14    ; radio 00 code window
SKIPRADIO   .equ   LEARNEE_GRP+15    ; flag to skip the radio read and write if
                                     ; learn or vacation are talking to it

temph       .equ   r0                ;
templ       .equ   r1                ;
temp        .equ   r2                ;
learndb     .equ   r3                ; learn debouncer
learnt      .equ   r4                ; learn timer
eraset      .equ   r5                ; erase timer
mtemph      .equ   r6                ; memory temp
mtempl      .equ   r7                ; memory temp
mtemp       .equ   r8                ; memory temp
serial      .equ   r9                ; serial data to and from nonvol memory
address     .equ   r10               ; address for the serial nonvol memory
t0ext       .equ   r11               ; timer 0 extend decremented every T0 int
t4ms        .equ   r12               ; 4 mS counter
t125ms      .equ   r13               ; 125mS counter
zzwin       .equ   r14               ;
skipradio   .equ   r15               ; flag to skip the radio read and write if
                                     ; learn or vacation are talking to it


PWM_GROUP        .EQU   40H
dnforce          .equ   r0
upforce          .equ   r1
up_force_hi      .equ   r4
up_force_lo      .equ   r5
up_force         .equ   rr4
dn_force_hi      .equ   r6
dn_force_lo      .equ   r7
dn_force         .equ   rr6
force_add_hi     .equ   r8
force_add_lo     .equ   r9
force_add        .equ   rr8
up_temp          .equ   r10
dn_temp          .equ   r11
pulsewidth       .equ   r12
pwm_count        .equ   r13

DNFORCE          .equ   40H
UPFORCE          .equ   41H
AOBSTEST         .equ   42H
FAULTTIME        .equ   43H
UP_FORCE_HI      .equ   44H
UP_FORCE_LO      .equ   45H
DN_FORCE_HI      .equ   46H
DN_FORCE_LO      .equ   47H
PULSEWIDTH       .equ   4CH
PWM_COUNT        .equ   4DH
AOBSF            .equ   4EH
FAULTCODE        .equ   4FH
```

```
RPM_GROUP          .EQU   50H

stackreason        .equ   r0
stackflag          .equ   r1
rpm_temp_hi        .equ   r2
rpm_temp_lo        .equ   r3
rpm_past_hi        .equ   r4
rpm_past_lo        .equ   r5
rpm_past           .equ   rr4
rpm_period_hi      .equ   r6
rpm_period_lo      .equ   r7
rpm_period         .equ   rr6
rpm_count          .equ   r8
rpm_diff_hi        .equ   r9
rpm_diff_lo        .equ   r10
rpm_2past_hi       .equ   r11
rpm_2past_lo       .equ   r12
rpm_set_diff_hi    .equ   r13
rpm_set_diff_lo    .equ   r14
rpm_time_out       .equ   r15

STACKREASON        .EQU   RPM_GROUP+0
STACKFLAG          .EQU   RPM_GROUP+1
RPM_TEMP_HI        .EQU   RPM_GROUP+2
RPM_TEMP_LO        .EQU   RPM_GROUP+3
RPM_PAST_HI        .EQU   RPM_GROUP+4
RPM_PAST_LO        .EQU   RPM_GROUP+5
RPM_PERIOD_HI      .EQU   RPM_GROUP+6
RPM_PERIOD_LO      .EQU   RPM_GROUP+7
RPM_COUNT          .EQU   RPM_GROUP+8
RPM_DIFF_HI        .EQU   RPM_GROUP+9
RPM_DIFF_LO        .EQU   RPM_GROUP+10
RPM_2PAST_HI       .EQU   RPM_GROUP+11
RPM_2PAST_LO       .EQU   RPM_GROUP+12
RPM_SET_DIFF_HI    .EQU   RPM_GROUP+13
RPM_SET_DIFF_LO    .EQU   RPM_GROUP+14
RPM_TIME_OUT       .EQU   RPM_GROUP+15


;**********************************************************************
; RADIO GROUP
;**********************************************************************
RADIO_GRP   .equ   60H             ;
RTEMP       .equ   RADIO_GRP       ; radio temp storage
RTEMPH      .equ   RADIO_GRP+1     ; radio temp storage high
RTEMPL      .equ   RADIO_GRP+2     ; radio temp storage low
RTIMEAH     .equ   RADIO_GRP+3     ; radio active time high byte
RTIMEAL     .equ   RADIO_GRP+4     ; radio active time low byte
RTIMEIH     .equ   RADIO_GRP+5     ; radio inactive time high byte
RTIMEIL     .equ   RADIO_GRP+6     ; radio inactive time low byte
RTIMEPH     .equ   RADIO_GRP+7     ; radio past time high byte
RTIMEPL     .equ   RADIO_GRP+8     ; radio past time low byte
RADIO3H     .equ   RADIO_GRP+9     ; 3 mS code storage high byte
```

```
RADIO3L       .equ    RADIO_GRP+10       ; 3 mS code storage low byte
RADIO1H       .equ    RADIO_GRP+11       ; 1 mS code storage high byte
RADIO1L       .equ    RADIO_GRP+12       ; 1 mS code storage low byte
RADIOC        .equ    RADIO_GRP+13       ; radio word count
RTIMEDH       .equ    RADIO_GRP+14       ; radio difference of active and inactive
RTIMEDL       .equ    RADIO_GRP+15       ; radio difference
rtemp         .equ    r0                 ; radio temp storage
rtemph        .equ    r1                 ; radio temp storage high
rtempl        .equ    r2                 ; radio temp storage low
rtimeah       .equ    r3                 ; radio active time high byte
rtimeal       .equ    r4                 ; radio active time low byte
rtimeih       .equ    r5                 ; radio inactive time high byte
rtimeil       .equ    r6                 ; radio inactive time low byte
rtimeph       .equ    r7                 ; radio past time high byte
rtimepl       .equ    r8                 ; radio past time low byte
radio3h       .equ    r9                 ; 3 mS code storage high byte
radio3l       .equ    r10                ; 3 mS code storage low byte
radio1h       .equ    r11                ; 1 mS code storage high byte
radio1l       .equ    r12                ; 1 mS code storage low byte
radioc        .equ    r13                ; radio word count
rtimedh       .equ    r14                ; radio difference of active and inactive
rtimedl       .equ    r15                ; radio difference

CHECK_GRP           .equ    70H
check_sum           .equ    r0                 ; check sum pointer
rom_data            .equ    r1
test_adr_hi         .equ    r2
test_adr_lo         .equ    r3
test_adr            .equ    rr2
CHECK_SUM           .equ    CHECK_GRP+0        ; check sum reg for por
ROM_DATA            .equ    CHECK_GRP+1        ; data read
AUXLEARNSW          .equ    CHECK_GRP+2        ;
RRTO                .equ    CHECK_GRP+3        ;
RPM_ACOUNT          .equ    74H                ; to test for active rpm
RSCCOUNT            .equ    75H                ; rs232 byte counter
RSSTART             .equ    76H                ; rs232 start flag

RADIO_CMD           .equ    77H                ; radio command
R_DEAD_TIME         .equ    78H                ;
FAULT               .equ    79H                ;

VACFLAG             .equ    7AH                ; VACATION mode flag
VACFLASH            .equ    7BH
VACCHANGE           .equ    7CH
TASKSWITCH          .equ    7DH
FORCE_IGNORE        .equ    7EH
FORCE_PRE           .equ    7FH
SDISABLE            .equ    80H                ; system disable timer
PRADIO3H            .equ    81H                ; 3 mS code storage high byte
PRADIO3L            .equ    82H                ; 3 mS code storage low byte
PRADIO1H            .equ    83H                ; 1 mS code storage high byte
PRADIO1L            .equ    84H                ; 1 mS code storage low byte
RTO                 .equ    85H                ; radio time out
RFLAG               .equ    86H                ; radio flags
RINFILTER           .equ    87H                ; radio input filter
```

```
LIGHT1S              .equ   88H          ; light timer for 1second flash
DOG2                 .equ   89H          ; second watchdog
FAULTFLAG            .equ   8BH          ; flag for fault blink stops radio blink
MOTDEL               .equ   8CH          ; motor time delay
LIGHTS               .equ   8DH          ; light state
DELAYC               .equ   8EH          ; for the time delay for command
COUNTER              .equ   8FH          ; delay counter

BACKUP_GRP           .equ   90H
BRPM_COUNT           .equ   BACKUP_GRP+1
BRPM_TIME_OUT        .equ   BACKUP_GRP+2
BFORCE_IGNORE        .equ   BACKUP_GRP+3
BAUTO_DELAY_HI       .equ   BACKUP_GRP+4
BAUTO_DELAY_LO       .equ   BACKUP_GRP+5
BAUTO_DELAY          .equ   BACKUP_GRP+4
BCMD_DEB             .equ   BACKUP_GRP+6
BSTATE               .equ   BACKUP_GRP+7


STACKTOP      .equ   238            ; start of the stack
STACKEND      .equ   0A0H           ; end of the stack


;P3           .equ   3              ; port 3
;P2           .equ   2              ; port 2
;P0           .equ   0              ; port 0

RS232OS       .equ   01000000B      ; RS232 output bit set
RS232OC       .equ   10111111B      ; RS232 output bit clear
RS232OP       .equ   P3             ; RS232 output port
RS232IP       .equ   P2             ; RS232 input port
RS232IM       .equ   00100000B      ; RS232 mask
csh           .equ   00010000B      ; chip select high for the 93c46
csl           .equ   11101111B      ; chip select low for 93c46
clockh        .equ   00001000B      ; clock high for 93c46
clockl        .equ   11110111B      ; clock low for 93c46
doh           .equ   00000100B      ; data out high for 93c46
dol           .equ   11111011B      ; data out low for 93c46
ledh          .equ   10000000B      ; turn the led pin high "on"
ledl          .equ   01111111B      ; turn the led pin low "off"
psmask        .equ   01000000B      ; mask for the program switch
csport        .equ   P2             ; chip select port
dioport       .equ   P2             ; data i/o port
clkport       .equ   P2             ; clock port
ledport       .equ   P2             ; led port
psport        .equ   P2             ; program switch port

WATCHDOG_GROUP .EQU   0FH
pcon                 .equ   r0
smr                  .equ   r11
wdtmr                .equ   r15

WDT           .macro
              .byte  5fh
              .endm
```

```
FILL        .macro
            .byte   0FFh
            .endm

TRAP        .macro
            jp      start
            jp      start
            jp      start
            jp      start
            jp      start
            .endm
TRAP10      .macro
            TRAP
            TRAP
            TRAP
            TRAP
            TRAP
            TRAP
            TRAP
            TRAP
            TRAP
            TRAP
            .endm

;*******************************************************************
;*
;*          Interrupt Vector Table
;*
;*******************************************************************

            .org    0000H

            .word   RADIO_INT           ;IRQ0
            .word   000CH               ;IRQ1, P3.3
            .word   RPM                 ;IRQ2, P3.1
            .word   AUX_OBS             ;IRQ3, P3.0
            .word   TIMERUD             ;IRQ4, T0
            .word   PWM                 ;IRQ5, T1

            .page
            .org    000CH
            jp      START               ; start jmps to start at location 0101 or 0202 ect

;-------------------------------------------------------------------
;           FORCE TABLE
;-------------------------------------------------------------------
force_table_50:
F_0:        .word       107FH
F_1:        .word       107FH
F_2:        .word       109DH
F_3:        .word       10BBH
F_4:        .word       10D9H
F_5:        .word       10F8H
```

```
F_6:     .word   1116H
F_7:     .word   1134H
F_8:     .word   1152H
F_9:     .word   1168H
F_10:    .word   117DH
F_11:    .word   1193H
F_12:    .word   119FH
F_13:    .word   11ABH
F_14:    .word   11B7H
F_15:    .word   11C3H
F_16:    .word   11CFH
F_17:    .word   11DFH
F_18:    .word   11E8H
F_19:    .word   11F4H
F_20:    .word   1200H
F_21:    .word   120CH
F_22:    .word   1218H
F_23:    .word   1224H
F_24:    .word   1230H
F_25:    .word   123CH
F_26:    .word   1248H
F_27:    .word   1254H
F_28:    .word   1260H
F_29:    .word   126CH
F_30:    .word   1278H
F_31:    .word   1284H
F_32:    .word   1291H
F_33:    .word   129DH
F_34:    .word   12BBH
F_35:    .word   12D9H
F_36:    .word   12F7H
F_37:    .word   1315H
F_38:    .word   1333H
F_39:    .word   1352H
F_40:    .word   1370H
F_41:    .word   138EH
F_42:    .word   13ACH
F_43:    .word   13CAH
F_44:    .word   1407H
F_45:    .word   1443H
F_46:    .word   147FH
F_47:    .word   14BCH
F_48:    .word   14F8H
F_49:    .word   1534H
F_50:    .word   1571H
F_51:    .word   15E9H
F_52:    .word   1626H
F_53:    .word   169EH
F_54:    .word   1717H
F_55:    .word   17D5H
F_56:    .word   1951H
F_57:    .word   1B8DH
F_58:    .word   1E86H
F_59:    .word   223EH
F_60:    .word   26B4H
F_61:    .word   2BE9H
```

```
F_62:       .word       31DDH
F_63:       .word       388EH
F_64:       .word       388EH

;--------------------------------------------------------------------------
;       RS232 DATA ROUTINES
;--------------------------------------------------------------------------

;       enter rs232 start with word to output in rs232do

RS232OSTART:
            push    rp                          ; save the rp
            srp     #TIMER_GROUP                ; set the group pointer
            clr     RSSTART                     ; one shot
            ld      rs232odelay,#6d             ; set the time delay to 3. mS
            clr     rs232docount                ; start with the counter at 0
            and     RS232OP,#RS232OC            ; clear the output
            jr      NORSOUT                     ;


RS232:
            cp      RSSTART,#0FFH               ; test for the start flag
            jr      z,RS232OSTART
RS232OUTPUT:
            push    rp                          ; save the rp
            srp     #TIMER_GROUP                ; set the group pointer
            cp      rs232docount,#11d           ; test for last
            jr      nz,RS232R
            or      RS232OP,#RS232OS            ; set the output idle
            JR      NORSOUT
RS232R:
            djnz    rs232odelay,NORSOUT         ; cycle count time delay
            inc     rs232docount                ; set the count for the next cycle
            scf                                 ; set the carry flag for stop bits
            rrc     rs232do                     ; get the data into the carry
            jr      c,RS232SET                  ; if the bit is high then set
            and     RS232OP,#RS232OC            ; clear the output
            jr      SETTIME                     ; find the delay time
RS232SET:
            or      RS232OP,#RS232OS            ; set the output
SETTIME:
            ld      rs232odelay,#6d             ; set the data output delay
            tm      rs232docount,#00000001b     ; test for odd words
            jr      z,NORSOUT                   ; if even done
            ld      rs232odelay,#7d             ; set the delay to 7 for odd
                                                ; this gives 6.5 *.512mS

NORSOUT:
RS232INPUT:
            cp      rs232dicount,#0FFH          ; test  mode
            jr      nz,RECEIVING                ; if receiving then jump
            tm      RS232IP,#RS232IM            ; test the incoming data
            jr      nz,NORSIN                   ; if the line is still idle then skip
            clr     rs232dicount                ; start at 0
            ld      rs232idelay,#3              ; set the delay to mid
RECEIVING:
```

```
            djnz   rs232idelay,NORSIN          ; skip till delay is up
            inc    rs232dicount                ; bit counter
            cp     rs232dicount,#10d           ; test for last timeout
            jr     z,DIEVEN
            tm     RS232IP,#RS232IM            ; test the incoming data
            rcf                                ; clear the carry
            jr     z,SKIPSETTING               ; if input bit not set skip setting carry
            scf                                ; set the carry
SKIPSETTING:
            rrc    rs232di                     ; save the data into the memory
            ld     rs232idelay,#6d             ; set the delay
            tm     rs232dicount,#00000001b     ; test for odd
            jr     z,NORSIN                    ; if even skip
            ld     rs232idelay,#7              ; set the delay
            jr     NORSIN
DIEVEN:
            ld     rs232dicount,#0FFH          ; turn off the input till next start
            ld     rscommand,rs232di           ; save the value
            clr    RSCCOUNT                    ; clear the counter
NORSIN:
            pop    rp                          ; return the rp
            ret
            FILL
            FILL

;*****************************************************************
; REGISTER INITILIZATION
;*****************************************************************

            .org   0101H                       ; address has both bytes the same
start:
START:      di                                 ; turn off the interrupt for init
            ld     RP,#WATCHDOG_GROUP
            ld     wdtmr,#00001111B            ; rc dog 100mS
            WDT                                ; kick the dog
            clr    RP                          ; clear the register pointer

;*****************************************************************
; PORT INITILIZATION
;*****************************************************************

            ld     P0,#P01S_INIT               ; RESET all ports
            ld     P2,#P2S_INIT-2              ; Set the up limit high , down limit low
            ld     P3,#P3S_INIT                ;
            ld     P01M,#P01M_INIT             ; set mode p00-p03 out p04-p07in
            ld     P3M,#P3M_INIT               ; set port3 p30-p33 input analog mode
                                               ; p34-p37 outputs
            ld     P2M,#(P2M_INIT-3)           ; set port 2 mode setting the limits as
                                               ; outputs for fema of open

;*****************************************************************
;*       Internal RAM Test and Reset All RAM =   mS        *
;*****************************************************************
            srp    #0F0h                       ; point to control group use stack
```

```
            ld      r15,#4                      ;r15= pointer (minimum of RAM)
write_again:
            WDT                                 ; KICK THE DOG
            ld      r14,#1
write_again1:
            ld      @r15,r14                    ;write 1,2,4,8,10,20,40,80
            cp      r14,@r15                    ;then compare
            jr      ne,system_error
            rl      r14
            jr      nc,write_again1
            clr     @r15                        ;write RAM(r5)=0 to memory
            inc     r15
            cp      r15,#240
            jr      ult,write_again


;*********************************************************************
;*          Checksum Test
;*********************************************************************
CHECKSUMTEST:
            srp     #CHECK_GRP
            ld      test_adr_hi,#0FH
            ld      test_adr_lo,#0FFH           ;maximum address=fffh
add_sum:
            WDT                                 ; KICK THE DOG
            ldc     rom_data,@test_adr          ;read ROM code one by one
            add     check_sum,rom_data          ;add it to checksum register
            decw    test_adr                    ;increment ROM address
            jr      nz,add_sum                  ;address=0 ?
            cp      check_sum,#check_sum_value
            jr      z,system_ok                 ;check final checksum = 00 ?
system_error:
            and     ledport,#ledl               ; turn on the LED to indicate fault
            jr      system_error

            .byte   256-check_sum_value
system_ok:
            WDT                                 ; kick the dog

            ld      STACKEND,#STACKTOP          ; start at the top of the stack
SETSTACKLOOP:
            ld      @STACKEND,#01H              ; set the value for the stack vector
            dec     STACKEND                    ; next address
            cp      STACKEND,#STACKEND          ; test for the last address
            jr      nz,SETSTACKLOOP             ; loop till done

CLEARDONE:

            ld      STATE,#06d                  ; set the state to stop
            ld      BSTATE,#06d                 ;
            ld      STATUS,#CHARGE              ; set start to charge
            ld      SWITCH_DELAY,#CMD_DEL_EX    ; set the delay time to cmd
```

```
        ld      LIGHT_TIMER_HI,#SET_TIME_HI      ; set the light period
        ld      LIGHT_TIMER_LO,#SET_TIME_LO      ; for the 4.5 min timer
        ld      PRE_LIGHT,#SET_TIME_PRE          ;
        ld      PULSEWIDTH,#MIN_COUNT    ; set init
        ld      PWM_COUNT,#TOTAL_PWM_COUNT;
        ld      RPMONES,#244d            ; set the hold off
        ld      RS232DOCOUNT,#11D        ; turn off the rs232 output
        srp     #LEARNEE_GRP             ;
        ld      learndb,#0FFH            ; set the learn debouncer
        ld      zzwin,learndb            ; turn off the learning
        ld      CMD_DEB,learndb          ; in case of shorted switches
        ld      BCMD_DEB,learndb         ; in case of shorted switches
        ld      VAC_DEB,learndb          ;
        ld      LIGHT_DEB,learndb        ;
        ld      ERASET,learndb           ; set the erase timer
        ld      learnt,learndb           ; set the learn timer
        ld      RTO,learndb              ; set the radio time out
        ld      AUXLEARNSW,learndb       ; turn off the aux learn switch
        ld      RRTO,learndb             ; set the radio timer

;*******************************************************************
; STACK INITILIZATION
;*******************************************************************
        clr     254
        ld      255,#238D                ; set the start of the stack


;*******************************************************************
; TIMER INITILIZATION
;*******************************************************************

        ld      PRE0,#00001001B          ; set the prescaler to / 2 for 8Mhz
        ld      PRE1,#01000010B          ; one shot mode /16
        ld      T0,#000H                 ; set the counter to count FF through 0
        ld      T1,MIN_COUNT             ; set init count
        ld      TMR,#00000011B           ; turn on the timer

;*******************************************************************
; PORT INITILIZATION
;*******************************************************************
        ld      P0,#P01S_INIT            ; RESET all ports
        ld      P2,#P2S_INIT             ;
        ld      P3,#P3S_INIT             ;
        ld      P01M,#P01M_INIT          ; set mode p00-p03 out p04-p07in
        ld      P3M,#P3M_INIT            ; set port3 p30-p33 input analog mode
                                         ; p34-p37 outputs
        ld      P2M,#(P2M_INIT+0)        ; set port 2 mode

;*******************************************************************
; READ THE MEMORY 2X AND GET THE VACFLAG
;*******************************************************************


        ld      SKIPRADIO,#0FFH          ;
        ld      ADDRESS,#1EH             ; set non vol address to the VAC flag
        call    READMEMORY               ; read the value 2X 1X INIT 2ND read
```

```
        call    READMEMORY              ; read the value
        ld      VACFLAG,MTEMPH          ; save into volital
        clr     SKIPRADIO

;*******************************************************************
; INITERRUPT INITILIZATION
;*******************************************************************
SETINTERRUPTS:
        ld      IPR,#00011010B          ; set the priority to timer
        ld      IMR,#ALL_ON_IMR         ; turn on the interrupt
        ld      IRQ,#01000000B          ; set the edge clear int
        ei                              ; enable interrupt

;*******************************************************************
; RESET SYSTEM REG
;*******************************************************************

        ld      RP,#WATCHDOG_GROUP
        ld      smr,#00100010B          ; reset the xtal / number
        ld      pcon,#01111110B         ; reset the pcon no comparator output
                                        ; no low emi mode
        ld      PRE0,#00001001B         ; set the prescaler to / 2 for 8Mhz
;       ld      RS232DO,#0BBH           ; set the rs232 data
;       jp      VACSWOPEN               ; start the transmission

;*******************************************************************
; MAIN LOOP
;*******************************************************************
MAINLOOP:
        clr     DOG2                    ; clear the second watchdog
        ld      P01M,#P01M_INIT         ; set mode p00-p03 out p04-p07in
        ld      P3M,#P3M_INIT           ; set port3 p30-p33 input analog mode
                                        ; p34-p37 outputs
        ld      P2M,#(P2M_INIT+0)       ; set port 2 mode
        cp      VACCHANGE,#0AAH         ; test for the vacation change flag
        jr      nz,NOVACCHG             ; if no change the skip
        cp      VACFLAG,#0FFH           ; test for in vacation
        jr      z,MCLEARVAC             ; if in vac clear
        ld      VACFLAG,#0FFH           ; set vacation
        jr      SETVACCHANGE            ; set the change
MCLEARVAC:
        clr     VACFLAG                 ; clear vacation mode
SETVACCHANGE:
        clr     VACCHANGE               ; one shot
        ld      SKIPRADIO,#0FFH         ; set skip flag
        ld      ADDRESS,#1EH            ; set the non vol address to the VAC flag
        ld      MTEMPH,VACFLAG          ; store the vacation flag
        ld      MTEMPL,VACFLAG          ;
        call    WRITEMEMORY             ; write the value
        clr     SKIPRADIO               ; clear skip flag
NOVACCHG:
        cp      STACKFLAG,#0FFH         ; test for the change flag
```

```
        jr    nz,NOCHANGEST       ; if no change skip updating

        srp   #LEARNEE_GRP        ; set the register pointer
        clr   STACKFLAG           ; clear the flag
        ld    SKIPRADIO,#0FFH     ; set skip flag
        ld    address,#1CH        ; set the non vol address to the cycle c
        call  READMEMORY          ; read the value
        inc   mtempl              ; increase the counter lower byte
        jr    nz,COUNTER1DONE     ;
        inc   mtemph              ; increase the counter high byte
        jr    nz,COUNTER2DONE     ;
        call  WRITEMEMORY         ; store the value
        inc   address             ; get the next bytes
        call  READMEMORY          ; read the data
        inc   mtempl              ; increase the counter low byte
        jr    nz,COUNTER2DONE     ;
        inc   mtemph              ; increase the vounter high byte
COUNTER2DONE:
        call  WRITEMEMORY         ; save the value
        ld    address,#1CH        ;
        call  READMEMORY          ; read the data

        and   mtemph,#00001111B   ; find the force address
        or    mtemph,#30H         ;
        ld    ADDRESS,MTEMPH      ; set the address
        ld    mtempl,DNFORCE      ; read the forces
        ld    mtemph,UPFORCE      ;
        call  WRITEMEMORY         ; write the value
        jr    CDONE               ; done set the back trace
COUNTER1DONE:
        call  WRITEMEMORY         ; got the new address
CDONE:
        ld    address,#1CH        ; get the first byte
        call  READMEMORY          ;
        and   mtempl,#00001111b   ; find the address
        ld    address,#20H        ;
        add   address,mtempl      ;
        ld    mtemph,STACKREASON        ;
        or    mtemph,STATE              ; or in the state
        call  WRITEMEMORY         ; write the value to stack
        clr   SKIPRADIO           ; clear skip flag

NOCHANGEST:
        call  LEARN               ; do the learn switch
        di
        cp    BRPM_COUNT,RPM_COUNT
        jr    z,TESTRPM
RESET:
        jp    START
TESTRPM:
        cp    BRPM_TIME_OUT,RPM_TIME_OUT
        jr    nz,RESET
        cp    BFORCE_IGNORE,FORCE_IGNORE
        jr    nz,RESET
        ei
        di
```

```
                cp      BAUTO_DELAY_HI,AUTO_DELAY_HI
                jr      nz,RESET
                cp      BAUTO_DELAY_LO,AUTO_DELAY_LO
                jr      nz,RESET
                cp      BCMD_DEB,CMD_DEB
                jr      nz,RESET
                cp      BSTATE,STATE
                jr      nz,RESET
                ei
TESTRS232:
                cp      RSSTART,#0FFH               ; test for starting a transmission
                jr      z,skiprs232                 ; if starting a trans skip
                cp      RSCOMMAND,#0FFH             ; test for the off mode
                jr      z,skiprs232
                cp      RS232DOCOUNT,#11d           ; test for output done
                jr      nz,skiprs232                ; if not the skip
                cp      RSCOMMAND,#30H              ; test for switch data
                jr      nz,TEST31
                clr     RS232DO                     ; clear the data

                tm      p2,#UP_LIMIT                ; test for up limit
                jr      nz,UPLIMOPEN
                or      RS232DO,#00000001B          ; set the marking bit
UPLIMOPEN:
                tm      p2,#DN_LIMIT                ; test for the down limit
                jr      nz,DNLIMOPEN                ;
                or      RS232DO,#00000010B          ; set the marking bit
DNLIMOPEN:
                cp      CMD_DEB,#0FFH               ; test for the command set
                jr      nz,CMDSWOPEN
                or      RS232DO,#00000100B          ; set the marking bit
CMDSWOPEN:
                cp      LIGHT_DEB,#0FFH             ; test for the worklight set
                jr      nz,WLSWOPEN
                or      RS232DO,#00001000B          ; set the marking bit
WLSWOPEN:
                cp      VAC_DEB,#0FFH               ; test fir the vacation set
                jr      nz,VACSWOPEN                ;
                or      RS232DO,#00010000B          ; set the marking bit
VACSWOPEN:
                dec     RSSTART                     ; set the start flag
                ld      RSCOMMAND,#0FFH             ; turn off command
                                                    ; return
skiprs232:
                jp      SKIPRS232

TEST31:
                cp      RSCOMMAND,#31H              ; test for status data
                jr      nz,TEST32
                ld      RS232DO,STATE               ; read the state
                cp      LEARNT,#0FFH                ; test for learn mode
                jr      z,NOTINLEARN
                or      RS232DO,#00010000B          ;
NOTINLEARN:
                cp      VACFLAG,#00H                ; test the vacation flag
                jr      z,NOTINVACATION
```

```
            or      RS232DO,#00100000B          ;

NOTINVACATION:
            tm      p0,#WORKLIGHT               ; test for the light on
            jr      z,LIGHTISOFF
            or      RS232DO,#01000000B          ; mark the bit
LIGHTISOFF:
            tm      AOBSF,#00000001B            ; test for aobs error
            jr      z,AOBSFINE
            or      RS232DO,#10000000B          ;
AOBSFINE:
            jr      VACSWOPEN


TEST32:
            cp      RSCOMMAND,#32H              ; test for rpm data
            jr      nz,TEST33
            ld      RS232DO,RPM_PERIOD_LO       ;
            cp      RSCCOUNT,#01H               ; test for on transmitted last cycle
            jr      z,LASTRPM
            ld      RS232DO,RPM_PERIOD_HI       ;
STARTOUT:
            dec     RSSTART                     ; set the start flag
            inc     RSCCOUNT                    ; increase the count
            jr      skiprs232                   ; return
LASTRPM:    clr     RSCCOUNT                    ; reset the counter
            jp      VACSWOPEN                   ; return

TEST33:
            cp      RSCOMMAND,#33H              ; test for force data
            jr      nz,TEST34
            ld      RS232DO,UPFORCE             ;
            cp      RSCCOUNT,#00                ; test for the first byte
            jr      z,STARTOUT                  ; output
            ld      RS232DO,DNFORCE
            jr      LASTRPM                     ; output

TEST34:
            cp      RSCOMMAND,#34H              ; test for radio page
            jr      nz,TEST35
            ld      RS232PAGE,#00H              ;
            jr      RS232PAGEOUT
TEST35:
            cp      RSCOMMAND,#35H              ; test for force page data
            jr      nz,TEST36
            ld      RS232PAGE,#10H              ;
            jr      RS232PAGEOUT
TEST36:
            cp      RSCOMMAND,#36H              ; test for history page 1data
            jr      nz,TEST37
            ld      RS232PAGE,#20H              ;
            jr      RS232PAGEOUT
TEST37:
            cp      RSCOMMAND,#37H              ; test for history page 2 data
            jr      nz,TEST38
            ld      RS232PAGE,#30H              ;
```

```
RS232PAGEOUT:
        ld      SKIPRADIO,#0FFH         ; set the skip radio flag
        ld      ADDRESS,RSCCOUNT        ; find the address
        rcf                             ;
        rrc     ADDRESS                 ;
        or      ADDRESS,RS232PAGE       ;
        call    READMEMORY              ; read the data
        ld      RS232DO,MTEMPH
        tm      RSCCOUNT,#01H           ; test which byte
        jr      z,RPBYTE
        ld      RS232DO,MTEMPL
RPBYTE:
        clr     SKIPRADIO               ; turn off the skip radio
        cp      RSCCOUNT,#1FH           ; test for the end
        jp      z,LASTRPM
        jp      STARTOUT

TEST38:
        cp      RSCOMMAND,#38H          ; test memory
        jr      nz,TEST39
        ld      RS232DO,#0FFH           ; flag set to error to start
        ld      SKIPRADIO,#0FFH         ; set the skip radio flag
        ld      MTEMPH,#0FFH            ; set the data to write
        ld      MTEMPL,#0FFH            ;
        ld      ADDRESS,#00             ; start at address 00
WRITELOOP1:
        WDT
        call    WRITEMEMORY             ;
        inc     ADDRESS                 ; do the next address
        cp      ADDRESS,#40H            ; test for the last address
        jr      nz,WRITELOOP1
        ld      ADDRESS,#00             ; start at address 0
READLOOP1:
        WDT
        call    READMEMORY              ; read the data
        inc     MTEMPH                  ; test the high
        jr      nz,MEMORYERROR          ; if error mark
        inc     MTEMPL                  ; test the low
        jr      nz,MEMORYERROR          ; if error mark
        inc     ADDRESS                 ; set the next address
        cp      ADDRESS,#40H            ; test for the last address
        jr      nz,READLOOP1

        ld      MTEMPH,#000H            ; set the data to write
        ld      MTEMPL,#000H            ;
        ld      ADDRESS,#00             ; start at address 00
WRITELOOP2:
        WDT
        call    WRITEMEMORY             ;
        inc     ADDRESS                 ; do the next address
        cp      ADDRESS,#40H            ; test for the last address
        jr      nz,WRITELOOP2
        ld      ADDRESS,#00             ; start at address 0
READLOOP2:
        WDT
```

```
         call   READMEMORY            ; read the data
         cp     MTEMPH,#00            ; test the high
         jr     nz,MEMORYERROR        ; if error mark
         cp     MTEMPL,#00            ; test the low
         jr     nz,MEMORYERROR        ; if error mark
         inc    ADDRESS               ; set the next address
         cp     ADDRESS,#40H          ; test for the last address
         jr     nz,READLOOP2
         call   CLEARCODES
         clr    SKIPRADIO             ; clear the skip radio flag
         clr    RS232DO               ; flag all ok
MEMORYERROR:
         jp     VACSWOPEN
TEST39:
         cp     RSCOMMAND,#39H        ; test memory
         jr     nz,SKIPRS232
         ld     RSCOMMAND,#0FFH       ; turn off command
         call   SETLEARN
SKIPRS232:
         cp     R_DEAD_TIME,#20       ; test for too long dead
         jp     nz,MAINLOOP           ; if not loop
         clr    RADIOC                ; clear the radio counter
         clr    RFLAG                 ; clear the radio flag
         jp     MAINLOOP              ; loop forever


;***********************************************************************
; Radio interrupt from a edge of the radio signal
;***********************************************************************

RADIO_INT:
         push   RP                    ; save the radio pair
         srp    #RADIO_GRP            ; set the register pointer

         ld     rtemph,T0EXT          ; read the upper byte
         ld     rtempl,T0             ; read the lower byte
         tm     IRQ,#00010000B        ; test for pending int
         jr     z,RTIMEOK             ; if not then ok time
         tm     rtempl,#10000000B     ; test for timer reload
         jr     z,RTIMEOK             ; if not reloaded then ok
         dec    rtemph                ; if reloaded then dec high for sync
RTIMEOK:
         clr    R_DEAD_TIME           ; clear the dead time
         and    IMR,#11111110B        ; turn off the radio interrupt
         ld     rtimedh,rtimeph       ; find the difference
         ld     rtimedl,rtimepl       ;
         sub    rtimedl,rtempl        ;
         sbc    rtimedh,rtemph        ; in the past time and the past time in temp
         tm     rtimedh,#10000000B    ; test for a negitive number
         jr     z,RTIMEDONE           ; if the number is not negitive then done
         ld     rtimedh,rtemph        ; find the difference
         ld     rtimedl,rtempl        ;
         sub    rtimedl,rtimepl       ;
```

```
        sbc     rtimedh,rtimeph         ; in the past time and the past time in temp
RTIMEDONE:
        tm      P3,#00000100B           ; test the port for the edge
        jr      nz,ACTIVETIME           ; if it was the active time then branch
INACTIVETIME:
        cp      RINFILTER,#0FFH         ; test for active last time
        jr      z,GOINACTIVE            ; if so continue
        jr      RADIO_EXIT              ; if not the return
GOINACTIVE:
        or      IRQ,#01000000B          ; set the bit setting direction to pos edge
        clr     RINFILTER               ; set flag to inactive
        ld      rtimeih,rtimedh         ; transfer difference to inactive
        ld      rtimeil,rtimedl         ;
        ld      rtimeph,rtemph          ; transfer temp into the past
        ld      rtimepl,rtempl          ;
        jr      RADIO_EXIT              ; return
ACTIVETIME:
        cp      RINFILTER,#00H          ; test for active last time
        jr      z,GOACTIVE              ; if so continue
        jr      RADIO_EXIT              ; if not the return
GOACTIVE:
        and     IRQ,#00111111B          ; clear the bit setting direction to neg edge
        ld      RINFILTER,#0FFH         ;
        ld      rtimeah,rtimedh         ; transfer difference to active
        ld      rtimeal,rtimedl         ;
        ld      rtimeph,rtemph          ; transfer temp into the past
        ld      rtimepl,rtempl          ;
        ei
        cp      radioc,#00H             ; test for blank time
        jr      nz,INSIGNAL             ; if the count is not zero then we are in signal
MEASUREBLANK:
        cp      rtimeih,#110D           ; test the timer for > 55mS
        jp      ugt,CLEARRADIO          ; if > 55 then clear the radio
        cp      rtimeih,#40D            ; test the timer for < 20mS
        jp      ult,CLEARRADIO          ; if < 20mS then clear the radio
        cp      rtimeah,#03H            ; test the sync pulse for a 3mS period first > 1
        jr      ugt,SETREC3MS           ; if 2mS or greater then 3mS sync code
        jr      nz,SETREC1MS            ; if less then 1 then it is a 1mS sync code
        cp      rtimeal,#09DH           ; test for 1.85 "middle value 2"
        jr      ugt,SETREC3MS           ; if greater then set a 3
SETREC1MS:
        tm      RFLAG,#00010000B        ; test for the reception of the 1mS code
        jr      z,SETFIRST1MS           ; if the bit is not set then this is the first 1ms
        and     RFLAG,#10111111B        ; clear the flag so writing into 3mS word
        or      RFLAG,#00100000B        ; set the flag saying 2nd 1mS word
        clr     radio3h                 ; clear the last reception
        clr     radio3l                 ;
        jr      INCCOUNT                ; then inc the count for insignal
SETFIRST1MS:
        or      RFLAG,#01000000B        ; set the flag for the first 1mS word
        clr     radio1h                 ; clear the last reception
        clr     radio1l                 ;
        jr      INCCOUNT                ; then inc the count for insignal
SETREC3MS:
        and     RFLAG,#10111111B        ; clear the flag so writing into 3mS word
        clr     radio3h                 ; clear the last reception
```

```
            clr     radio3l             ;
INCCOUNT:
            inc     radioc              ; set the counter to the next word
            jr      RADIO_EXIT

RADIO_EXIT: pop     RP                  ; reset the register pair
            iret

INSIGNAL:
            cp      rtimeah,#9D         ; test the radio pulse width for 4.5mS
            jp      ugt,CLEARRADIO      ; if greater then 4.5 then clear the radio
PULSEWOK:
            cp      rtimeih,#9D         ; test the radio blank width for 4.5mS
            jp      ugt,CLEARRADIO      ; if greater then 4.5 then clear the radio
BLANKWOK:
            ld      rtemph,rtimeih      ; transfer pulse time to temp reg
            ld      rtempl,rtimeil      ;
            sub     rtempl,rtimeal      ; subtract the pulse from the blank
            sbc     rtemph,rtimeah      ;
            jr      c,NEGDIFF           ; if the difference is negitive then branch
            cp      rtemph,#01H         ; test for a number 1
            jr      ugt,SETTO0          ; if greater then set 0
            jr      ult,SETTO1          ; if less then 1 set to 1
            tm      rtempl,#10000000B   ; test for 80 or greater
            jr      z,SETTO1            ; if the diff is less then 80h
            jr      SETTO0              ; else set to a zero
NEGDIFF:
            ld      rtemph,rtimeah      ; transfer pulse time to temp reg
            ld      rtempl,rtimeal      ;
            sub     rtempl,rtimeil      ; subtract the pulse from the blank
            sbc     rtemph,rtimeih      ;
            cp      rtemph,#01H         ; test for a number 1
            jr      ugt,SETTO2          ; if greater then set 2
            jr      ult,SETTO1          ; if less then 1 set to 1
            tm      rtempl,#10000000B   ; test for 80 or greater
            jr      z,SETTO1            ; if the diff is less then 80h one
            jr      SETTO2              ; else set to a two
SETTO0:
            ld      RTEMP,#00D          ; set the bit value to a 00
            jr      INCRECORD           ; goto adding into the record
SETTO1:
            ld      RTEMP,#01D          ; set the bit value to a 01
            jr      INCRECORD           ; goto adding into the record
SETTO2:
            ld      RTEMP,#02D          ; set the bit value to a 10
            jr      INCRECORD           ; goto adding into the record

INCRECORD:
            tm      RFLAG,#01000000B    ; test the radio flag for the area to be modifing
            jr      z,MS3RECORD         ;  if the bit is cleared then working the 3ms
            ld      rtemph,radio1h      ; transfer the record to temp
            ld      rtempl,radio1l      ;
            add     radio1l,rtempl      ; add the number to it self 2* for for base 3
            adc     radio1h,rtemph      ;
            add     radio1l,rtempl      ;
            adc     radio1h,rtemph      ;
```

```
        add     radio1l,rtemp           ;
        adc     radio1h,#00h            ;
        inc     radioc                  ; increase the radio counter
        cp      radioc,#11D             ; test for the last bit
        jr      z,GOTAWORD              ; if so we got a word
        jp      ugt,CLEARRADIO          ; else garbage
        jr      RADIO_EXIT              ; else return till the next bit comes along

MS3RECORD:
        ld      rtemph,radio3h          ; transfer the record to temp
        ld      rtempl,radio3l          ;
        add     radio3l,rtempl          ; add the number to it self 2* for for base 3
        adc     radio3h,rtemph          ;
        add     radio3l,rtempl          ;
        adc     radio3h,rtemph          ;
        add     radio3l,rtemp           ; add in the new value
        adc     radio3h,#00D            ;
        inc     radioc                  ; increase the radio counter
        cp      radioc,#11D             ; test for the last bit
        jr      z,GOTAWORD              ; if so we got a word
        jp      RADIO_EXIT              ; else return till the next bit comes along

GOTAWORD:
        tm      RFLAG,#01000000B        ; test the radio flag for the area we just modifing
        jr      z,MARK3REC              ;  if the bit is cleared then the 3ms is filled
        or      RFLAG,#00010000B        ; set the flag
        jr      TESTFORTWO              ; jump to test for two codes
MARK3REC:
        or      RFLAG,#00001000B        ; set the flag
        jr      TESTFORTWO              ; jump to test for two codes
DONEONE:
        clr     radioc                  ; clear the radio counter
        jp      RADIO_EXIT              ; return
TESTFORTWO:
        tm      RFLAG,#00010000B        ; test for the 1mS word
        jr      z,DONEONE               ; we just have one code done
        tm      RFLAG,#00001000B        ; test for the 3mS word
        jr      z,DONEONE               ; we just have one code done
        tm      RFLAG,#00100000B        ; test the flag for BC
        jr      z,KNOWCODE              ; if A code we do nothing
        or      RFLAG,#00000010B        ; set the B and C flag
        cp      rtemp,#00               ; test word 10 for a 0 "C" code
        jp      z,KNOWCODE              ; if a C code were done
        or      RFLAG,#00000100B        ; set the B code flag
brec:
        cp      ZZWIN,#64D              ; test for 8 seconds from known B code
        jr      ugt,KNOWCODE            ; if not skip test
        cp      STATE,#6                ; test for the stopped state
        jr      z,timezzwin             ; if stopped test zzwin
        cp      STATE,#5                ; test for the down limit
        jr      z,timezzwin             ; if at the down limit
        cp      STATE,#2                ; test for at up limit
        jr      z,timezzwin             ; if at the limit jump
        jr      KNOWCODE                ; else no way
timezzwin:
        cp      radio3h,#90H            ; test for the 00 code
```

```
        jr      nz,KNOWCODE         ;
        cp      radio3l,#29H        ; test for the 00 code
        jr      nz,KNOWCODE         ;
SETFB:
        push    RP
        srp     #LEARNEE_GRP
        call    SETLEARN
        pop     RP
        jp      CLEARRADIO
KNOWCODE:
        clr     RRTO                ; clear the got a radio flag
        cp      SKIPRADIO,#0FFH     ; test for the skip flag
        jp      z,CLEARRADIO        ; if skip flag is active then donot look at EE mem

        ld      ADDRESS,#1EH        ; set the non vol address to the VAC flag
        call    READMEMORY          ; read the value
        ld      VACFLAG,MTEMPH      ; save into volital
        cp      LEARNT,#0FFH        ; test for in learn mode
        jr      z,TESTCODE          ; if out of learn mode then test for matching
STORECODE:
        cp      PRADIO1H,radio1h    ; test for the match
        jr      nz,STORENOTMATCH ; if not a match then loop again
        cp      PRADIO1L,radio1l    ; test for the match
        jr      nz,STORENOTMATCH ; if not a match then loop again
        cp      PRADIO3H,radio3h    ; test for the match
        jr      nz,STORENOTMATCH ; if not a match then loop again
        cp      PRADIO3L,radio3l    ; test for the match
        jr      nz,STORENOTMATCH ; if not a match then loop again
        call    TESTCODES           ; test the code to see if in memory now
        cp      ADDRESS,#0FFH       ;
        jr      nz,NOWRITESTORE     ; if there is a match pretend to store

STOREMATCH:
        tm      RFLAG,#00000100B    ; test for the b code
        jr      nz,BCODE            ; if a B code jump
        tm      RFLAG,#00000010B    ; test for a C code
        jr      nz,CCODE            ; if a C code jump
ACODE:
        ld      ADDRESS,#1FH        ; set the address to read the last written
        call    READMEMORY          ; read the memory
        inc     MTEMPH              ; add 2 to the last written
        inc     MTEMPH              ;
        and     MTEMPH,#11111110B ; set the address on a even number
        cp      MTEMPH,#17H         ; test for the last address
        jr      ult,GOTAADDRESS     ; if not the last address jump
        ld      MTEMPH,#00D         ; set the address to 0
GOTAADDRESS:
        ld      ADDRESS,#1FH        ; set the address to write the last written
        ld      RTEMP,MTEMPH        ; save the address
        LD      MTEMPL,MTEMPH       ; both bytes same
        call    WRITEMEMORY         ; write it
        ld      ADDRESS,rtemp       ; set the address
        jr      READYTOWRITE        ;
BCODE:
        cp      radio3h,#90H        ; test for the 00 code
        jr      nz,BCODEOK          ;
```

```
        cp      radio3l,#29H            ; test for the 00 code
        jr      nz,BCODEOK              ;
        jp      CLEARRADIO              ; SKIP MAGIC NUMBER
BCODEOK:
        ld      ADDRESS,#18H            ; set the address for the B code
        jr      READYTOWRITE            ;
CCODE:
        ld      ADDRESS,#1AH            ; set the address for the C code
READYTOWRITE:
        call    WRITECODE               ; write the code in radio1 and radio3
NOWRITESTORE:
        xor     p0,#WORKLIGHT           ; toggle light
        or      ledport,#ledh           ; turn off the LED for program mode
        ld      LIGHT1S,#244D           ; turn on the 1 second blink
        ld      LEARNT,#0FFH            ; set learnmode timer
        clr     RTO                     ; disallow cmd from learn
        jp      CLEARRADIO              ; return
STORENOTMATCH:
        ld      PRADIO1H,radio1h        ; transfer radio into past
        ld      PRADIO1L,radio1l        ;
        ld      PRADIO3H,radio3h        ;
        ld      PRADIO3L,radio3l        ;
        jp      CLEARRADIO              ; get the next code


TESTCODE:
        cp      FAULTFLAG,#0FFH         ; test for a active fault
        jr      z,FS1                   ; if a avtive fault skip led set and reset
        and     ledport,#ledl           ; turn on the LED for flashing from signal
FS1:
        call    TESTCODES               ; test the codes
        cp      FAULTFLAG,#0FFH         ; test for a active fault
        jr      z,FS2                   ; if a avtive fault skip led set and reset
        or      ledport,#ledh           ; turn off the LED for flashing from signal
FS2:
        cp      ADDRESS,#0FFH           ; test for the not matching state
        jr      nz,GOTMATCH             ; if matching the send a command if needed
        jp      CLEARRADIO              ; else clear the radio
GOTMATCH:
        or      RFLAG,#00000001B        ; set the flag for recieving without error
        cp      RTO,#101D               ; test for the timer time out
        jr      ult,NOTNEWMATCH         ; if the timer is active then donot reissue cmd
TESTVAC:
        cp      VACFLAG,#00B            ; test for the vacation mode
        jr      z,TSTSDISABLE           ; if not in vacation mode test the system disable

        cp      ADDRESS,#19H            ; test for the B code
        jr      nz,NOTNEWMATCH          ; if not a B not a match
TSTSDISABLE:
        cp      SDISABLE,#32D           ; test for 4 second
        jr      ult,NOTNEWMATCH         ; if 6 s not up not a new code
        clr     RTO                     ; clear the radio timeout
        cp      ONEP2,#00               ; test for the 1.2 second time out
        jr      nz,NOTNEWMATCH          ; if the timer is active then skip the command
RADIOCOMMAND:
```

```
        clr     RTO                 ; clear the radio timeout
        cp      ADDRESS,#19H        ; test for a B code
        jr      nz,BDONTSET         ; if not a b code donot set flag
zzwinclr:
        clr     ZZWIN               ; flag got matching B code

        ld      BCODEFLAG,#077H     ; flag for aobs bypass
BDONTSET:

        clr     LAST_CMD            ; mark the last command as radio
        ld      RADIO_CMD,#0AAH     ; set the radio command
        jr      CLEARRADIO          ; return
TESTCODES:
        clr     ADDRESS             ; start address is 0
NEXTCODE:
        call    READMEMORY          ; read the word at this address
        cp      MTEMPH,radio1h      ; test for the match
        jr      nz,NOMATCH          ; if not matching then do next address
        cp      MTEMPL,radio1l      ; test for the match
        jr      nz,NOMATCH          ; if not matching then do next address
        inc     ADDRESS             ; set the second half of the code
        call    READMEMORY          ; read the word at this address
        cp      MTEMPH,radio3h      ; test for the match
        jr      nz,NOMATCH2         ; if not matching then do the next address
        cp      MTEMPL,radio3l      ; test for the match
        jr      nz,NOMATCH2         ; if not matching then do the next address
        ret                         ; return with the address of the match

NOMATCH:
        inc     ADDRESS             ; set the address to the next code
NOMATCH2:
        inc     ADDRESS             ; set the address to the next code
        cp      ADDRESS,#1CH        ; test for the last address
        jr      ult,NEXTCODE        ; if not the last address then try again

GOTNOMATCH:
        ld      ADDRESS,#0FFH       ; set the no match flag
        ret                         ; and return


NOTNEWMATCH:
        clr     RTO                 ; reset the radio time out
        and     RFLAG,#00000001B    ; clear radio flags leaving recieving w/o error
        clr     radioc              ; clear the radio bit counter
        ld      LEARNT,#0FFH        ; set the learn timer "turn off" and backup
        jp      RADIO_EXIT          ; return

CLEARRADIO:
        and     IRQ,#00111111B      ; clear the bit setting direction to neg edge
        ld      RINFILTER,#0FFH     ; set flag to active
CLEARRADIOA:
        tm      RFLAG,#00000001B    ; test for receiving without error
        jr      z,SKIPRTO           ; if flag not set then donot clear timer
        clr     RTO                 ; clear radio timer
SKIPRTO:
        clr     radioc              ; clear the radio counter
```

```
        clr     RFLAG                   ; clear the radio flag
        jp      RADIO_EXIT              ; return

;**********************************************************************
; LEARN DEBOUNCES THE LEARN SWITCH 80mS
; TIMES OUT THE LEARN MODE 30 SECONDS
; DEBOUNCES THE LEARN SWITCH FOR ERASE 6 SECONDS
;**********************************************************************
LEARN:
        srp     #LEARNEE_GRP            ; set the register pointer
        cp      STATE,#DN_POSITION      ; test for motor stoped
        jr      z,TESTLEARN             ;
        cp      STATE,#UP_POSITION      ; test for motor stoped
        jr      z,TESTLEARN             ;
        cp      STATE,#STOP             ; test for motor stoped
        jr      z,TESTLEARN             ;
;       ld      learnt,#0FFH            ; set the learn timer
        cp      learnt,#240D            ; test for the learn 30 second timeout
        jr      nz,ERASETEST            ; if not then test erase
        jr      learnoff                ; if 30 seconds then turn off the learn mode
TESTLEARN:
        cp      learndb,#236D           ; test for the debounced release
        jr      nz,LEARNNOTRELEASED ; if the debouncer not released then jump

        clr     learndb                 ; clear the debouncer

        ret                             ; return

LEARNNOTRELEASED:
        cp      learnt,#0FFH            ; test for learn mode
        jr      nz,INLEARN              ; if in learn jump
        cp      learndb,#20D            ; test for debounce period
        jr      nz,ERASETEST            ; if not then test the erase period
SETLEARN:
        clr     learnt                  ; clear the learn timer
        ld      learndb,#0FFH           ; set the debouncer
        and     ledport,#ledl           ; turn on the led
        clr     VACFLAG                 ; clear vacation mode
        ld      address,#1EH            ; set the non vol address for vacation
        clr     mtemph                  ; clear the data for cleared vacation
        clr     mtempl                  ;
        ld      skipradio,#0FFH         ; set the flag
        call    WRITEMEMORY             ; write the memory
        clr     skipradio               ; clear the flag
ERASETEST:
        cp      learndb,#0FFH           ; test for learn button active
        jr      nz,ERASERELEASE         ; if button released set the erase timer
        cp      eraset,#0FFH            ; test for timer active
        jr      nz,ERASETIMING          ; if the timer active jump
        clr     eraset                  ; clear the erase timer
ERASETIMING:
        cp      eraset,#48D             ; test for the erase period
        jr      z,ERASETIME             ; if timed out the erase
        ret                             ; else we return
ERASETIME:
```

```
        or      ledport,#ledh           ; turn off the led
        ld      skipradio,#0FFH         ; set the flag to skip the radio read
        call    CLEARCODES              ; clear all codes in memory
        clr     skipradio               ; reset the flag to skip radio

        ld      learnt,#0FFH            ; set the learn timer
        ret                             ; return


ERASERELEASE:
        ld      eraset,#0FFH            ; turn off the erase timer
        ret                             ; return

INLEARN:
        cp      learndb,#20D            ; test for the debounce period
        jr      nz,TESTLEARNTIMER       ; if not then test the learn timer for time out
        ld      learndb,#0FFH           ; set the learn db
TESTLEARNTIMER:
        cp      learnt,#240D            ; test for the learn 30 second timeout
        jr      nz,ERASETEST            ; if not then test erase
learnoff:
        or      ledport,#ledh           ; turn off the led
        ld      learnt,#0FFH            ; set the learn timer
        ld      learndb,#0FFH           ; set the learn debounce
        jr      ERASETEST               ; test the erase timer


;**********************************************************************
;
; WRITE WORD TO MEMORY
; ADDRESS IS SET IN REG ADDRESS
; DATA IS IN REG MTEMPH AND MTEMPL
; RETURN ADDRESS IS UNCHANGED
;**********************************************************************
;
WRITEMEMORY:
        push    RP                      ; SAVE THE RP
        srp     #LEARNEE_GRP            ; set the register pointer

        call    STARTB                  ; output the start bit
        ld      serial,#00110000B       ; set byte to enable write
        call    SERIALOUT               ; output the byte
        and     csport,#csl             ; reset the chip select
        call    STARTB                  ; output the start bit
        ld      serial,#01000000B       ; set the byte for write
        or      serial,address          ; or in the address
        call    SERIALOUT               ; output the byte
        ld      serial,mtemph           ; set the first byte to write
        call    SERIALOUT               ; output the byte
        ld      serial,mtempl           ; set the second byte to write
        call    SERIALOUT               ; output the byte
        call    ENDWRITE                ; wait for the ready status
        call    STARTB                  ; output the start bit
        ld      serial,#00000000B       ; set byte to disable write
        call    SERIALOUT               ; output the byte
        and     csport,#csl             ; reset the chip select
        pop     RP                      ; reset the RP
```

```
            ret

;*******************************************************************
; READ WORD FROM MEMORY
; ADDRESS IS SET IN REG ADDRESS
; DATA IS RETURNED IN REG MTEMPH AND MTEMPL
; ADDRESS IS UNCHANGED
;*******************************************************************
READMEMORY:
            push    RP                      ;
            srp     #LEARNEE_GRP            ; set the register pointer

            call    STARTB                  ; output the start bit
            ld      serial,#10000000B       ; preamble for read
            or      serial,address          ; or in the address
            call    SERIALOUT               ; output the byte
            call    SERIALIN                ; read the first byte
            ld      mtemph,serial           ; save the value in mtemph
            call    SERIALIN                ; read teh second byte
            ld      mtempl,serial           ; save the value in mtempl
            and     csport,#csl             ; reset the chip select
            pop     RP                      ;
            ret

;*******************************************************************
; WRITE CODE TO 2 MEMORY ADDRESS
; CODE IS IN RADIO1H RADIO1L RADIO3H RADIO3L
;*******************************************************************
WRITECODE:
            push    RP                      ;
            srp     #LEARNEE_GRP            ; set the register pointer
            ld      mtemph,RADIO1H          ; transfer the data from radio 1 to the temps
            ld      mtempl,RADIO1L          ;
            call    WRITEMEMORY             ; write the temp bits
            inc     address                 ; next address
            ld      mtemph,RADIO3H          ; transfer the data from radio 3 to the temps
            ld      mtempl,RADIO3L          ;
            call    WRITEMEMORY             ; write the temps
            pop     RP                      ;
            ret                             ; return

;*******************************************************************
; CLEAR ALL RADIO CODES IN THE MEMORY
;*******************************************************************

CLEARCODES:
            push    RP                      ;
            srp     #LEARNEE_GRP            ; set the register pointer
            ld      RADIO1H,#0FFH           ; set the codes to illegal codes
            ld      RADIO1L,#0FFH           ;
            ld      RADIO3H,#0FFH           ;
            ld      RADIO3L,#0FFH           ;
            ld      address,#00H            ; clear address 0
CLEARC:
            call    WRITECODE               ; "A0"
            inc     address                 ; set the next address
```

```
        cp      address,#1BH          ; test for the last address of radio
        jr      ult,CLEARC
        clr     mtemph                ; clear data
        clr     mtempl
        ld      address,#1FH          ; clear address F
        call    WRITEMEMORY           ;
        pop     RP                    ;
        ret                           ; return

;*****************************************************************
; START BIT FOR SERIAL NONVOL
; ALSO SETS DATA DIRECTION AND AND CS
;*****************************************************************
STARTB:
        and     csport,#csl           ;
        and     clkport,#clockl       ; start by clearing the bits
        and     dioport,#dol          ;
        ld      P2M,#(P2M_INIT+0)     ; set port 2 mode forcing output mode data
        or      csport,#csh           ; set the chip select
        or      dioport,#doh          ; set the data out high
        or      clkport,#clockh       ; set the clock
        and     clkport,#clockl       ; reset the clock low
        and     dioport,#dol          ; set the data low
        ret                           ; return

;*****************************************************************
; END OF CODE WRITE
;*****************************************************************
ENDWRITE:
        and     csport,#csl           ; reset the chip select
        nop                           ; delay
        or      csport,#csh           ; set the chip select
        ld      P2M,#(P2M_INIT+4)     ; set port 2 mode forcing input mode data
ENDWRITELOOP:
        ld      temph,dioport         ; read the port
        and     temph,#doh            ; mask
        jr      z,ENDWRITELOOP        ; if the bit is low then loop till we are done
        and     csport,#csl           ; reset the chip select
        ld      P2M,#(P2M_INIT+0)     ; set port 2 mode forcing output mode
        ret

;*****************************************************************
; SERIAL OUT
; OUTPUT THE BYTE IN SERIAL
;*****************************************************************
SERIALOUT:
        ld      P2M,#(P2M_INIT+0)     ; set port 2 mode forcing output mode data
        ld      templ,#8H             ; set the count for eight bits
SERIALOUTLOOP:
        rlc     serial                ; get the bit to output into the carry
        jr      nc,ZEROOUT            ; output a zero if no carry
ONEOUT:
        or      dioport,#doh          ; set the data out high
        or      clkport,#clockh       ; set the clock high
```

```
        and     clkport,#clockl         ; reset the clock low
        and     dioport,#dol            ; reset the data out low
        djnz    templ,SERIALOUTLOOP
                                        ; loop till done
        ret                             ; return
ZEROOUT:
        and     dioport,#dol            ; reset the data out low
        or      clkport,#clockh         ; set the clock high
        and     clkport,#clockl         ; reset the clock low
        and     dioport,#dol            ; reset the data out low
        djnz    templ,SERIALOUTLOOP
                                        ; loop till done
        ret                             ; return

;**********************************************************************
; SERIAL IN
; INPUTS A BYTE TO SERIAL
;**********************************************************************
SERIALIN:
        ld      P2M,#(P2M_INIT+4)       ; set port 2 mode forcing input mode data
        ld      templ,#8H               ; set the count for eight bits
SERIALINLOOP:
        or      clkport,#clockh         ; set the clock high
        rcf                             ; reset the carry flag
        ld      temph,dioport           ; read the port
        and     temph,#doh              ; mask out the bits
        jr      z,DONTSET
        scf                             ; set the carry flag
DONTSET:
        rlc     serial                  ; get the bit into the byte
        and     clkport,#clockl         ; reset the clock low
        djnz    templ,SERIALINLOOP
                                        ; loop till done
        ret                             ; return

;**********************************************************************
; TIMER UPDATE FROM INTERUPT EVERY 1mS
;**********************************************************************
TIMERUD:
        dec     T0EXT                   ; decrement the T0 extension
        inc     TASKSWITCH              ; set to the next switch
        and     TASKSWITCH,#00000111B        ; 0-7
        tm      TASKSWITCH,#00000001B        ; test for odd
        jr      nz,TK1357                    ; if so then jump
        cp      TASKSWITCH,#2d               ; test for 2
        jr      z,TASK2
        cp      TASKSWITCH,#4d               ; test for 4
        jr      z,TASK4
        cp      TASKSWITCH,#6d               ; test for 6
        jr      z,TASK6
TASK0:
                or      IMR,#RETURN_IMR      ; turn on the interrupt
                ei
                push    rp                   ; save the rp
                srp     #TIMER_GROUP         ; set the rp for the switches
```

```
            call    switches              ; test the switches
            pop     rp
            iret

TASK2:
            or      IMR,#RETURN_IMR       ; turn on the interrupt
            ei
            push    rp                    ; save the rp
            srp     #TIMER_GROUP          ;
            call    STATEMACHINE          ; do the motor function
            pop     rp                    ; return the rp
            iret

TASK4:
            or      IMR,#RETURN_IMR       ; turn on the interrupt
            ei
            push    rp                    ; save the rp
            srp     #TIMER_GROUP          ; set the rp for the switches
            call    switches              ; test the switches
            pop     rp
            iret

TK1357:
            cp      TASKSWITCH,#05D       ; test for task 5
            jp      nz,TASK1357EXIT       ;

TASK5:
            cp      PWM_STATUS,#0FFH
            jr      ne,enable_t1          ;
            dec     PWM_OFF               ; discharge for at least 2x
            jr      nz,continue           ;
            ld      PWM_STATUS,#00H
enable_t1:
            ld      PWM_OFF,#14H          ;
            or      p3,#PWM_HI            ; take pwm pin high
            or      tmr,#TIMER_1_EN       ; enable t1
continue:
            jp      TASK1357EXIT          ; EXIT UPDATING TIMERS

TASK6:
            or      IMR,#RETURN_IMR       ; turn on the interrupt
            ei
            push    rp                    ; save the rp
            srp     #TIMER_GROUP          ;
            call    STATEMACHINE          ; do the motor function
            pop     rp                    ; return the rp
            iret

TASK1357EXIT
            push    RP
            or      IMR,#RETURN_IMR       ; turn on the interrupt
```

```
                ei
                call    RS232                   ; do the rs232 buss
                tm      TASKSWITCH,#00000001B   ; test for state a 1 in b0
                jr      z,ONEMS
                tm      TASKSWITCH,#00000010B   ; test for state a 1 in b1
                jr      z,ONEMS
                srp     #TIMER_GROUP            ; if a 3 or 7 then do the auxlight
                call    AUXLIGHT                ;

ONEMS:
                srp     #LEARNEE_GRP            ; set the register pointer
                dec     AOBSTEST                ; decrease the aobs test timer
                jr      nz,NOFAIL               ; if the timer not at 0 then it didnot fail
                ld      AOBSTEST,#11d           ; if it failed reset the timer
                or      AOBSF,#00000001b        ; set the failed flag bit
NOFAIL:
                inc     t4ms                    ; increment the 4mS timer
                inc     t125ms                  ; increment the 125 mS timer
                cp      t4ms,#4D                ; test for the time out
                jp      nz,TEST125              ; if not true then jump
FOURMS:
                clr     t4ms                    ; reset the timer
                cp      RPMONES,#00H            ; test for the end of the one sec timer
                jr      z,TESTPERIOD            ; if one sec over then test the pulses
                                                ; over the period
                dec     RPMONES                 ; else decrease the timer
                di
                clr     RPM_COUNT               ; start with a count of 0
                clr     BRPM_COUNT              ; start with a count of 0
                ei
                jr      RPMTDONE
TESTPERIOD:
                cp      RPMCLEAR,#00H           ; test the clear test timer for 0
                jr      nz,RPMTDONE             ; if not timed out then skip
                ld      RPMCLEAR,#122d          ; set the clear test time for next cycle .5
                cp      RPM_COUNT,#50d          ; test the count for too many pulses
                jr      ugt,FAREV               ; if too man pulses then reverse
                di
                clr     RPM_COUNT               ; clear the counter
                clr     BRPM_COUNT              ; clear the counter
                ei
;               clr     FAREVFLAG               ; clear the flag   temp test
                jr      RPMTDONE                ; continue
FAREV:
                ld      FAULTCODE,#06h          ; set the fault flag
                ld      FAREVFLAG,#088H         ; set the forced up flag
                and     p0,#^LB ^C WORKLIGHT    ; turn off light
                ld      REASON,#80H             ; rpm forcing up motion
                call    SET_AREV_STATE          ; set the autorev state
RPMTDONE:
                dec     RPMCLEAR                ; decrement the timer
                cp      LIGHT1S,#00             ; test for the end
                jr      z,SKIPLIGHTE
                dec     LIGHT1S                 ; down count the light time
SKIPLIGHTE:
                inc     R_DEAD_TIME
```

```
                cp      RTO,#101D           ; test for the radio time out
                jr      ult,DONOTCB         ; if not timed out donot clear b
                clr     BCODEFLAG           ; else clear the b code flag
DONOTCB:
                inc     RTO                 ; increment the radio time out
                jr      nz,RTOOK            ; if the radio timeout ok then skip
                dec     RTO                 ; back turn
RTOOK:
                cp      RRTO,#0FFH          ; test for roll
                jr      z,SKIPRRTO          ; if so then skip
                inc     RRTO
SKIPRRTO:                                   ;
                ld      temp,psport         ; read the program switch
                and     temp,#psmask        ; mask for switch
                jr      z,PRSWCLOSED        ; if the switch is closed count up
                cp      learndb,#00         ; test for the non decrement point
                jr      z,LEARNDBOK         ; if at end skip dec
                dec     learndb             ;
                jr      LEARNDBOK           ;

PRSWCLOSED:
                inc     learndb             ; increase the learn debounce timer
                cp      learndb,#0H         ; test for overflow
                jr      nz,LEARNDBOK        ; if not 0 skip back turning
                dec     learndb             ;
LEARNDBOK:

TEST125:
                cp      t125ms,#125D        ; test for the time out
                jr      z,ONE25MS           ; if true the jump
                cp      t125ms,#63D         ; test for the other timeout
                jr      nz,N125
                call    FAULTB
N125:
                pop     RP
                iret
ONE25MS:
                cp      AUXLEARNSW,#0FFh    ; test for the rollover position
                jr      z,SKIPAUXLEARNSW    ; if so then skip
                inc     AUXLEARNSW          ; increase
SKIPAUXLEARNSW:
                cp      ZZWIN,#0FFH         ; test for the roll position
                jr      z,TESTFA            ; if so skip
                inc     ZZWIN               ; if not increase the counter
TESTFA:
                call    FAULTB              ; call the fault blinker
                clr     t125ms              ; reset the timer
                inc     DOG2                ; incrwease the second watch dog
                di
                inc     SDISABLE            ; count off the system disable timer
                jr      nz,DO12             ; if not rolled over then do the 1.2 sec
                dec     SDISABLE            ; else reset to FF
DO12:
                cp      ONEP2,#00           ; test for 0
                jr      z,INCLEARN          ; if counted down then increment learn
                dec     ONEP2               ; else down count
```

```
INCLEARN:
            inc     learnt              ; increase the learn timer
            cp      learnt,#0H          ; test for overflow
            jr      nz,LEARNTOK         ; if not 0 skip back turning
            dec     learnt              ;
LEARNTOK:
            ei
            inc     eraset              ; increase the erase timer
            cp      eraset,#0H          ; test for overflow
            jr      nz,ERASETOK         ; if not 0 skip back turning
            dec     eraset              ;
ERASETOK:
            pop     RP
            iret

;       fault blinker

FAULTB:
            inc     FAULTTIME           ; increase the fault timer
            cp      FAULTTIME,#80h      ; test for the end
            jr      nz,FIRSTFAULT       ; if not timed out
            clr     FAULTTIME           ; reset the clock
            clr     FAULT               ; clear the last
            cp      FAULTCODE,#05h      ; test for call dealer code
            jr      UGE,GOTFAULT        ; set the fault
            cp      CMD_DEB,#0FFH       ; test the debouncer
            jr      nz,TESTAOBSM        ; if not set test aobs
            cp      FAULTCODE,#03h      ; test for command shorted
            jr      z,GOTFAULT          ; set the error
            ld      FAULTCODE,#03h      ; set the code
            jr      FIRSTFAULT          ;
TESTAOBSM:
            tm      AOBSF,#00000001b    ; test for the skiped aobs pulse
            jr      z,NOAOBSFAULT       ; if no skips then no faults
            tm      AOBSF,#00000010b    ; test for any pulses
            jr      z,NOPULSE           ; if no pulses find if hi or low
                                        ; else we are intermittent
            ld      FAULTCODE,#04h      ; set the fault
            jr      GOTFAULT            ; if same got fault
;           cp      FAULTCODE,#04h      ; test the last fault
;           jr      z,GOTFAULT          ; if same got fault
;           ld      FAULTCODE,#04h      ; set the fault
;           jr      FIRSTFC             ;
NOPULSE:    tm      P3,#00000001b       ; test the input pin
            jr      z,AOBSSH            ; jump if aobs is stuck hi
            cp      FAULTCODE,#01h      ; test for stuck low in the past
            jr      z,GOTFAULT          ; set the fault
            ld      FAULTCODE,#01h      ; set the fault code
            jr      FIRSTFC             ;
AOBSSH:     cp      FAULTCODE,#02h      ; test for stuck high in past
            jr      z,GOTFAULT          ; set the fault
            ld      FAULTCODE,#02h      ; set the code
            jr      FIRSTFC             ;

GOTFAULT:   ld      FAULT,FAULTCODE     ; set the code
            swap    FAULT               ;
```

```
                jr      FIRSTFC                 ;
NOAOBSFAULT:
                clr     FAULTCODE               ; clear the fault code
FIRSTFC:        clr     AOBSF                   ; clear flags

FIRSTFAULT:
                cp      FAULT,#00               ; test for no fault
                jr      z,NOFAULT
                ld      FAULTFLAG,#0FFH         ; set the fault flag
                cp      LEARNT,#0FFH            ; test for not in learn mode
                jr      nz,TESTSDI              ; if in learn then skip setting
                cp      FAULT,FAULTTIME         ;
                jr      ULE,TESTSDI

                tm      FAULTTIME,#00001000b    ; test the 1 sec bit
                jr      nz,BITONE
                and     ledport,#ledl           ; turn on the led
                ret

BITONE:
                or      ledport,#ledh           ; turn off the led
TESTSDI:
                ret

NOFAULT:        clr     FAULTFLAG               ; clear the flag
                ret

;---------------------------------------------------------------------------
; MOTOR STATE MACHINE
;---------------------------------------------------------------------------

STATEMACHINE:
        call    RS232
        xor     p0,#00001000b           ; toggle aux output
        cp      DOG2,#8d                ; test the 2nd watchdog for problem
        jp      ugt,START               ; if problem reset
        cp      STATE,#06d              ; test for legal number
        jp      ugt,start               ; if not the reset
        jp      z,stop                  ; stop motor            6
        cp      STATE,#03d              ; test for legal number
        jp      z,start                 ; if not the reset
        cp      STATE,#00d              ; test for autorev
        jp      z,auto_rev              ; auto reversing        0
        cp      STATE,#01d              ; test for up
        jp      z,up_direction          ; door is going up      1
        cp      STATE,#02d              ; test for autorev
        jp      z,up_position           ; door is up            2
        cp      STATE,#04d              ; test for autorev
        jp      z,dn_direction          ; door is going down    4
        jp      dn_position             ; door is down          5

;---------------------------------------------------------------------------
; AUX OBSTRUCTION OUTPUT AND LIGHT FUNCTION
;---------------------------------------------------------------------------
```

```
AUXLIGHT:
test_light_on:
        cp      LIGHT_FLAG,#LIGHT           ;
        jr      z,dec_pre_light             ;
        cp      LIGHT1S,#00                 ; test for no flash
        jr      z,NO1S                      ; if not skip
        cp      LIGHT1S,#01d                ; test for timeout
        jr      nz,NO1S                     ; if not skip
        xor     p0,#WORKLIGHT               ; toggle light
        clr     LIGHT1S                     ; oneshoted
NO1S:
        cp      FLASH_FLAG,#FLASH
        jr      nz,dec_pre_light            ;
        decw    FLASH_DELAY                 ; 250 ms period
        jr      nz,dec_pre_light            ;
        xor     p0,#WORKLIGHT               ; toggle light
        ld      FLASH_DELAY_HI,#FLASH_HI
        ld      FLASH_DELAY_LO,#FLASH_LO
        dec     FLASH_COUNTER               ;
        jr      nz,dec_pre_light
        clr     FLASH_FLAG                  ;
dec_pre_light:
        cp      LIGHT_TIMER_HI,#0FFH        ; test for the timer ignore
        jr      z,exit_light                ; if set then ignore
        dec     PRE_LIGHT                   ;  dec 3 byte light timer
        jr      nz,exit_light               ;
        decw    LIGHT_TIMER                 ;
        jr      nz,exit_light               ; if timer 0 turn off the light
        and     p0,#^C LIGHT_ON             ; turn off the light
exit_light:
        ret                                 ; return
;-----------------------------------------------------------------------
;               AUTO_REV ROUTINE
;-----------------------------------------------------------------------

auto_rev:
        cp      FAREVFLAG,#088H             ; test for the forced up flag
        jr      nz,LEAVEREV
        and     p0,#^LB ^C WORKLIGHT        ; turn off light
;       clr     FAREVFLAG                   ; one shot temp test
LEAVEREV:
        WDT                                 ; kick the dog
        call    HOLDFREV                    ; hold off the force reverse
        ld      LIGHT_FLAG,#LIGHT           ; force the light on no blink
        and     p0,#^LB ^C MOTOR_UP ^& #^C MOTOR_DN    ; disable motor
        di
        decw    AUTO_DELAY                  ; wait for .5 second
        decw    BAUTO_DELAY                 ; wait for .5 second
        ei
        jr      nz,arswitch                 ; test switches


        or      p0,#00001000b               ; set aux output for FEMA


        tm      p2,#UP_LIMIT                ; test the limit
```

```
        jr      nz,NOUPLIM              ; if limit set stop
        LD      REASON,#60H             ; set the reason as early limit
        jp      SET_STOP_STATE          ; set stop
NOUPLIM:
        ld      REASON,#40H             ; set the reason for the change
        jp      SET_UP_DIR_STATE        ; set the state
arswitch:
        ld      REASON,#00H             ; set the reason to command
        cp      SW_DATA,#CMD_SW         ; test for a command
        jp      z,SET_STOP_STATE        ; if so then stop
        ld      REASON,#10H             ; set the reason as radio command
        cp      RADIO_CMD,#0AAH         ; test for a radio command
        jp      z,SET_STOP_STATE        ; if so the stop
exit_auto_rev:
        ret                             ; return


HOLDFREV:
        ld      RPMONES,#244d           ; set the hold off
        ld      RPMCLEAR,#122d          ; clear rpm reverse .5 sec
        di
        clr     RPM_COUNT               ; start with a count of 0
        clr     BRPM_COUNT              ; start with a count of 0
        ei
        ret


;-----------------------------------------------------------------------
;               DOOR GOING UP
;-----------------------------------------------------------------------

up_direction:
        WDT                             ; kick the dog
        call    HOLDFREV                ; hold off the force reverse
        ld      LIGHT_FLAG,#LIGHT       ; force the light on no blink
        and     p0,#^LB ^C MOTOR_DN     ; disable down relay

        cp      MOTDEL,#0FFH            ; test for done
        jr      z,UPON                  ; if done skip delay
        inc     MOTDEL                  ; increase the delay timer
        or      p0,#LIGHT_ON            ; turn on the light
        cp      MOTDEL,#20d             ; test for 40 seconds
        jr      ule,UPOFF               ; if not timed
UPON:
        or      p0,#MOTOR_UP ^| #LIGHT_ON   ; turn on the motor and light
UPOFF:
        cp      FORCE_IGNORE,#01        ; test fro the end of the force ignore
        jr      nz,SKIPUPRPM            ; if not donot test rpmcount
        cp      RPM_ACOUNT,#02H         ; test for less the 2 pulses
        jr      ugt,SKIPUPRPM           ;
        ld      FAULTCODE,#05h
SKIPUPRPM:
        cp      FORCE_IGNORE,#00        ; test timer for done
        jr      nz,test_up_sw_pre       ; if timer not up do not test force
TEST_UP_FORCE:
        di
```

```
                dec     RPM_TIME_OUT                ; decrease the timeout
                dec     BRPM_TIME_OUT               ; decrease the timeout
                ei
                jr      z,failed_up_rpm
                di                                  ; turn off the interrupt
                ld      RPM_SET_DIFF_LO,UP_FORCE_LO
                ld      RPM_SET_DIFF_HI,UP_FORCE_HI
                sub     RPM_SET_DIFF_LO,RPM_PERIOD_LO
                sbc     RPM_SET_DIFF_HI,RPM_PERIOD_HI
                tm      RPM_SET_DIFF_HI,#10000000B      ; test high bit for sign
                jr      z,test_up_sw                ; if the rpm period is ok then switch
failed_up_rpm:
                ld      REASON,#20H                 ; set the reason as force
                jp      SET_STOP_STATE
test_up_sw_pre:
                dec     FORCE_PRE                   ; dec the prescaler
                tm      FORCE_PRE,#00000001B        ; test for odd /2
                jr      nz,test_up_sw               ; if odd skip
                di
                dec     FORCE_IGNORE
                dec     BFORCE_IGNORE
test_up_sw:
                ei                                  ; enable interrupt
                tm      p2,#UP_LIMIT                ; have we reached the limit?
                jr      z,up_limit_dec              ;
                ld      limit,#LIMIT_COUNT          ;
                jr      get_sw                      ;
up_limit_dec:
                djnz    limit,get_sw                ; dec debounce count
                ld      REASON,#50H                 ; set the reason as limit
                jp      SET_UP_POS_STATE            ;
get_sw:
                ld      REASON,#10H                 ; set the radio command reason
                cp      RADIO_CMD,#0AAH             ;  test for a radio command
                jp      z,SET_STOP_STATE            ; if so stop
                ld      REASON,#00H                 ; set the reason as a command
                cp      SW_DATA,#CMD_SW             ;  test for a command condition
                jr      ne,test_up_time             ;
                jp      SET_STOP_STATE              ;
test_up_time:
                ld      REASON,#70H                 ; set the reason as a time out
                decw    MOTOR_TIMER                 ; decrement motor timer
                jp      z,SET_STOP_STATE            ;
exit_up_dir:
                ret                                 ; return to caller
;-----------------------------------------------------------------------------
;               DOOR UP
;-----------------------------------------------------------------------------

up_position:
                WDT                                 ; kick the dog
                cp      FAREVFLAG,#088H             ; test for the forced up flag
                jr      nz,LEAVELIGHT
                and     p0,#^LB ^C WORKLIGHT         ; turn off light
                jr      UPNOFLASH                   ; skip clearing the flash flag
LEAVELIGHT:
```

```
                ld      LIGHT_FLAG,#00H             ; allow blink
UPNOFLASH:
                ld      limit,#LIMIT_COUNT          ;
                and     p0,#^LB ^C MOTOR_UP ^& #^C MOTOR_DN   ; disable motor
                cp      SW_DATA,#LIGHT_SW           ; light sw debounced?
                jr      z,work_up                   ;
                ld      REASON,#10H                 ; set the reason as a radio command
                cp      RADIO_CMD,#0AAH             ; test for a radio cmd
                jr      z,SETDNDIRSTATE             ; if so start down
                ld      REASON,#00H                 ; set the reason as a command
                cp      SW_DATA,#CMD_SW             ; command sw debounced?
                jr      z,SETDNDIRSTATE             ; if command
                ret
SETDNDIRSTATE:
                ld      ONEP2,#10D                  ; set the 1.2 sec timer
                jp      SET_DN_DIR_STATE

work_up:
                xor     p0,#WORKLIGHT               ; toggle work light
                ld      LIGHT_TIMER_HI,#0FFH        ; set the timer ignore
up_pos_ret:
                ret                                 ; return
;-----------------------------------------------------------------------------
;               DOOR GOING DOWN
;-----------------------------------------------------------------------------

dn_direction:
                WDT                                 ; kick the dog
                call    HOLDFREV                    ; hold off the force reverse
                clr     FLASH_FLAG                  ; turn off the flash
                ld      LIGHT_FLAG,#LIGHT           ; force the light on no blink
                and     p0,#^LB ^C MOTOR_UP         ; turn off motor up
                cp      MOTDEL,#0FFH                ; test for done
                jr      z,DNON                      ; if done skip delay
                inc     MOTDEL                      ; increase the delay timer
                or      p0,#LIGHT_ON                ; turn on the light
                cp      MOTDEL,#20d                 ; test for 40 seconds
                jr      ule,DNOFF                   ; if not timed
DNON:

                or      p0,#MOTOR_DN ^| #LIGHT_ON   ; turn on the motor and light
DNOFF:
                cp      FORCE_IGNORE,#01            ; test fro the end of the force ignore
                jr      nz,SKIPDNRPM                ; if not donot test rpmcount
                cp      RPM_ACOUNT,#02H             ; test for less the 2 pulses
                jr      ugt,SKIPDNRPM               ;
                ld      FAULTCODE,#05h
SKIPDNRPM:
                cp      FORCE_IGNORE,#00            ; test timer for done
                jr      nz,test_dn_sw_pre           ; if timer not up do not test force
TEST_DOWN_FORCE:
                di
                dec     RPM_TIME_OUT                ; decrease the timeout
                dec     BRPM_TIME_OUT               ; decrease the timeout
                ei
                jr      z,failed_dn_rpm
```

```
        di                                      ; turn off the interrupt
        ld      RPM_SET_DIFF_LO,DN_FORCE_LO
        ld      RPM_SET_DIFF_HI,DN_FORCE_HI
        sub     RPM_SET_DIFF_LO,RPM_PERIOD_LO
        sbc     RPM_SET_DIFF_HI,RPM_PERIOD_HI
        tm      RPM_SET_DIFF_HI,#10000000B      ; test high bit for sign
        jr      z,test_dn_sw                    ; if the rpm period is ok then switch

failed_dn_rpm:
        ld      REASON,#20H                     ; set the reason as force
        jp      SET_AREV_STATE                  ; set the state
test_dn_sw_pre:
        dec     FORCE_PRE                       ; dec the prescaler
        tm      FORCE_PRE,#00000001B            ; test for odd /2
        jr      nz,test_dn_sw                   ; if odd skip
        di
        dec     FORCE_IGNORE
        dec     BFORCE_IGNORE
test_dn_sw:
        ei                                      ; turn on the interrupt
        tm      p2,#DN_LIMIT                    ; are we at down limit?
        jr      z,dn_limit_dec                  ;
        ld      limit,#LIMIT_COUNT              ; reset the limit
        jr      call_sw_dn                      ;
dn_limit_dec:
        djnz    limit,call_sw_dn                ; dec debounce counter
        ld      REASON,#50H                     ; set the reason as a limit
        cp      CMD_DEB,#0FFH                   ; test for the switch still held
        jr      nz,TESTRADIO                    ;
        ld      REASON,#90H                     ; closed with the control held
        jr      TESTFORCEIG
TESTRADIO:
        cp      LAST_CMD,#00                    ; test for the last command being radio
        jr      nz,TESTFORCEIG                  ; if not test force
        cp      BCODEFLAG,#077H                 ; test for the b code flag
        jr      nz,TESTFORCEIG                  ;
        ld      REASON,#0A0H                    ; set the reason as b code to limit
TESTFORCEIG:
        cp      FORCE_IGNORE,#00H               ; test the force ignore for done
        jr      z,NOAREVDN                      ; a rev if limit before force enabled
        ld      REASON,#60h                     ; early limit
        jp      SET_AREV_STATE                  ; set autoreverse
NOAREVDN:
        and     p0,#^LB ^C MOTOR_DN             ;
        jp      SET_DN_POS_STATE                ; set the state
call_sw_dn:
        ld      REASON,#10H                     ; set the reason as radio command
        cp      RADIO_CMD,#0AAH                 ; test for a radio command
        jp      z,SET_AREV_STATE                ; if so arev
        ld      REASON,#00H                     ; set the reason as command
        cp      SW_DATA,#CMD_SW                 ;  test for command
        jp      z,SET_AREV_STATE                ;
test_dn_time:
        ld      REASON,#70H                     ; set the reason as timeout
        decw    MOTOR_TIMER                     ; decrement motor timer
        jp      z,SET_AREV_STATE                ;
```

```
dec_obs_count:
            djnz   obs_count,exit_dn_dir          ; dec aux obs count
            cp     LAST_CMD,#00                   ; test for the last command from radio
            jr     z,OBSTESTB                     ; if last command was a radio test b
            cp     CMD_DEB,#0FFH                  ; test for the command switch holding
            jr     nz,OBSAREV                     ; if the command switch is not holding
                                                  ; do the autorev
            ret                                   ; otherwise skip
OBSAREV:
            ld     FLASH_FLAG,#0FFH               ; set flag
            ld     FLASH_COUNTER,#20              ; set for 10 flashes
            ld     FLASH_DELAY_HI,#FLASH_HI; set for .5 Hz period
            ld     FLASH_DELAY_LO,#FLASH_LO
            ld     REASON,#30H                    ; set the reason as autoreverse
            jp     SET_AREV_STATE                 ;
OBSTESTB:
            cp     BCODEFLAG,#077H                ; test for the b code flag
            jr     nz,OBSAREV                     ; if not b code then arev
exit_dn_dir:
;           ld     REASON,#0B0H                   ; set the reason as command not held
;           cp     FAREVFLAG,#088H                ; test forced up flag
;           jr     nz,exit_2_dn                   ; if the forced up flag clear skip
;           cp     CMD_DEB,#0FFH                  ; test for a held command
;           jr     z,exit_2_dn                    ; if the command is held keep going
;           cp     LAST_CMD,#00                   ; test for the last command being radio
;           jr     nz,do_reverse                  ; if not do reverse
;           cp     BCODEFLAG,#077H                ; test for the b code flag
,           jr     z,exit_2_dn                    ; if set skip till either is released
;do_reverse:
;           jp     SET_AREV_STATE                 ; set the autoreverse state
;exit_2_dn:
            ret                                   ; return

;------------------------------------------------------------------------
;           DOOR DOWN
;------------------------------------------------------------------------

dn_position:
            WDT                                   ; kick the dog
            cp     FAREVFLAG,#088H                ; test for the forced up flag
            jr     nz,DNLEAVEL                    ;
            and    p0,#^LB ^C WORKLIGHT            ; turn off light
            jr     DNNOFLASH                      ; skip clearing the flash flag
DNLEAVEL:
            ld     LIGHT_FLAG,#00H                ; allow blink
DNNOFLASH:
            ld     limit,#LIMIT_COUNT             ;
            and    p0,#^LB ^C MOTOR_UP ^& #^C MOTOR_DN    ; disable motor
            cp     SW_DATA,#LIGHT_SW              ; debounced? light
            jr     z,work_dn                      ;
            ld     REASON,#10H                    ; set the reason as a radio command
            cp     RADIO_CMD,#0AAH                ; test for a radio command
            jr     z,SETUPDIRSTATE                ; if so go up
            ld     REASON,#00H                    ; set the reason as a command
            cp     SW_DATA,#CMD_SW                ; command sw pressed?
            jr     z,SETUPDIRSTATE                ; if so go up
```

```
        ret

SETUPDIRSTATE:
        ld      ONEP2,#10D              ; set the 1.2 sec timer
        jp      SET_UP_DIR_STATE

work_dn:
        xor     p0,#WORKLIGHT           ; toggle work light
        ld      LIGHT_TIMER_HI,#0FFH    ; set the timer ignore
dn_pos_ret:
        ret                             ; return
;-----------------------------------------------------------------
;       STOP
;-----------------------------------------------------------------

stop:
        WDT                             ; kick the dog
        cp      FAREVFLAG,#088H         ; test for the forced up flag
        jr      nz,LEAVESTOP
        and     p0,#^LB ^C WORKLIGHT    ; turn off light
LEAVESTOP:
        ld      LIGHT_FLAG,#00H         ; allow blink
        and     p0,#^LB ^C MOTOR_UP ^& #^C MOTOR_DN   ; disable motor
        cp      SW_DATA,#LIGHT_SW       ; debounced? light
        jr      z,work_stop             ;
        ld      REASON,#10H             ; set the reason as radio command
        cp      RADIO_CMD,#0AAH         ; test for a radio command
        jp      z,SET_DN_DIR_STATE      ; if so go down
        ld      REASON,#00H             ; set the reason as a command
        cp      SW_DATA,#CMD_SW         ; command sw pressed?
        jp      z,SET_DN_DIR_STATE      ; if so go down
        ret
work_stop:
        xor     p0,#WORKLIGHT           ; toggle work light
        ld      LIGHT_TIMER_HI,#0FFH    ; set the timer ignore
stop_ret:
        ret                             ; return

;-----------------------------------------------------------------
;       SET THE AUTOREV STATE
;-----------------------------------------------------------------
SET_AREV_STATE:
        di                              ;
        ld      STATE,#AUTO_REV         ; if we got here, then reverse motor
        jr      SET_ANY

;-----------------------------------------------------------------
;       SET THE STOPPED STATE
;-----------------------------------------------------------------
SET_STOP_STATE:
        di
        ld      STATE,#STOP             ;
        jr      SET_ANY

;-----------------------------------------------------------------
;       SET THE DOWN DIRECTION STATE
```

```
;-----------------------------------------------------------------------
SET_DN_DIR_STATE:
        di
        ld      STATE,#DN_DIRECTION         ; energize door
        clr     FAREVFLAG                   ; one shot the forced reverse
        tm      p2,#DN_LIMIT                ; are we at down limit?
        jr      nz,SET_ANY                  ; if not at limit set dn
                                            ; else set the dn position
;-----------------------------------------------------------------------
;       SET THE DOWN POSITION STATE
;-----------------------------------------------------------------------
SET_DN_POS_STATE:
        di
        ld      STATE,#DN_POSITION          ; load new state
        jr      SET_ANY

;-----------------------------------------------------------------------
;       SET THE UP DIRECTION STATE
;-----------------------------------------------------------------------
SET_UP_DIR_STATE:
        di
        ld      STATE,#UP_DIRECTION         ;
        tm      p2,#UP_LIMIT                ; have we reached the limit?
        jr      nz,SET_ANY                  ; if not set the state
                                            ; else fall throught and set pos state
;-----------------------------------------------------------------------
;       SET THE UP POSITION STATE
;-----------------------------------------------------------------------
SET_UP_POS_STATE:
        di
        ld      STATE,#UP_POSITION          ;

;-----------------------------------------------------------------------
;       SET ANY STATE
;-----------------------------------------------------------------------
SET_ANY:
        ld      BSTATE,STATE                ; set the backup state
        di
        clr     RPM_COUNT                   ; clear the rpm counter
        clr     BRPM_COUNT                  ;
        ld      AUTO_DELAY_HI,#AUTO_HI      ; set the .5 second auto rev timer
        ld      AUTO_DELAY_LO,#AUTO_LO      ;
        ld      BAUTO_DELAY_HI,#AUTO_HI     ; set the .5 second auto rev timer
        ld      BAUTO_DELAY_LO,#AUTO_LO     ;
        ld      FORCE_IGNORE,#ONE_SEC       ; set the force ignore timer to one sec
        ld      BFORCE_IGNORE,#ONE_SEC; set the force ignore timer to one sec
        ei
        clr     RADIO_CMD                   ; one shot
        clr     RPM_ACOUNT                  ; clear the rpm active counter
        ld      LIMIT,#LIMIT_COUNT          ;
        ld      MOTOR_TIMER_HI,#MOTOR_HI
        ld      MOTOR_TIMER_LO,#MOTOR_LO
        ld      STACKREASON,REASON          ; save the temp reason
        ld      STACKFLAG,#0FFH             ; set the flag
TURN_ON_LIGHT:
        ld      LIGHT_TIMER_HI,#SET_TIME_HI ; set the light period
```

```
                ld      LIGHT_TIMER_LO,#SET_TIME_LO    ;
                ld      PRE_LIGHT,#SET_TIME_PRE        ;
                ld      LIGHTS,P0                      ; read the light state
                and     LIGHTS,#WORKLIGHT              ;
                jr      nz,lighton                     ; if the light is on skip clearing
lightoff:
                clr     MOTDEL                         ; clear the motor delay
lighton:
                ret


;------------------------------------------------------------------------
;               THIS THE AUXILARY OBSTRUCTION INTERRUPT ROUTINE
;------------------------------------------------------------------------

AUX_OBS:
                ld      OBS_COUNT,#6D                  ; reset pulse counter (no obstruction)
                and     imr,#11110111b                 ; turn off the interupt for up to 500uS
                ld      AOBSTEST,#11D                  ; reset the test timer
                or      AOBSF,#00000010B               ; set the flag for got a aobs
                iret                                   ; return from int

;------------------------------------------------------------------------
;               THIS IS THE MOTOR RPM INTERRUPT ROUTINE
;------------------------------------------------------------------------
RPM:
                push    rp                             ; save current pointer
                srp     #RPM_GROUP                     ;point to these reg
                ld      rpm_temp_hi,T0EXT              ; read the timer extension
                ld      rpm_temp_lo,T0                 ; read the timer
                tm      IRQ,#00010000B                 ; test for a pending interrupt
                jr      z,RPMTIMEOK                    ; if not then time ok
RPMTIMEERROR:
                tm      rpm_temp_lo,#10000000B         ; test for timer reload
                jr      z,RPMTIMEOK                    ; if no reload time is ok
                dec     rpm_temp_hi                    ; if reloaded then dec the hi to resync
RPMTIMEOK:
                and     imr,#11111011b                 ; turn off the interupt for up to 500uS

                ld      rpm_2past_hi,rpm_past_hi       ; save the past for testing
                ld      rpm_2past_lo,rpm_past_lo       ;
                ld      rpm_past_hi,rpm_temp_hi        ; transfer the present into the past
                ld      rpm_past_lo,rpm_temp_lo        ;
                ld      rpm_diff_hi,rpm_2past_hi       ; transfer the past into the difference
                ld      rpm_diff_lo,rpm_2past_lo       ;
                sub     rpm_diff_lo,rpm_past_lo        ; find the difference
                sbc     rpm_diff_hi,rpm_past_hi        ;
                tm      rpm_diff_hi,#10000000b         ; test for neg number
                jr      z,RPM_TIME_FOUND               ; if the time is correct then jump
                ld      rpm_diff_hi,rpm_past_hi        ; transfer the temp into the difference
                ld      rpm_diff_lo,rpm_past_lo        ;
                sub     rpm_diff_lo,rpm_2past_lo       ; find the difference
                sbc     rpm_diff_hi,rpm_2past_hi       ;
RPM_TIME_FOUND:
                ld      rpm_period_hi,rpm_diff_hi      ; transfer the difference to the period
                ld      rpm_period_lo,rpm_diff_lo      ;
```

```
                ei
                di
                cp      rpm_period_hi,#12D          ; test for a period of at least 6.144mS
                jr      ult,SKIPC                   ; if the period is less then skip counting
                cp      STATE,#05h                  ; test for the down limit state
                jr      z,CLRC                      ; if set clear the counter
TULS:
                cp      STATE,#02H                  ; test for the up limit state
                jr      nz,INCRPM                   ; if not then increment the rpm state
                tm      P2,#UP_LIMIT                ; test for the up limit still set
                jr      nz,INCRPM                   ; if not then set
CLRC:
                clr     RPM_COUNT                   ; clear the rpm counter
                clr     BRPM_COUNT                  ;
                jr      SKIPC                       ;
INCRPM:
                inc     RPM_COUNT                   ; increase the rpm count
                inc     BRPM_COUNT                  ; increase the rpm count
                inc     RPM_ACOUNT                  ; increase the rpm count
SKIPC:
                ld      rpm_time_out,#15D           ; set the rpm max period as 30mS
                ld      BRPM_TIME_OUT,#15D          ; set the rpm max period as 30mS
                                                    ; if rpm not updated by then reverse

                ei
SKIPPEDGE:
                pop     rp                          ; return the rp
                iret                                ; return


;-----------------------------------------------------------------------------
;               THIS IS THE SWITCH TEST SUBROUTINE
;
;       STATUS
;       0 => COMMAND TEST
;       1 => WORKLIGHT TEST
;       2 => VACATION TEST
;       3 => CHARGE
;
;       SWITCH DATA
;       0 => OPEN
;       1 => COMMAND        CMD_SW
;       2 => WORKLIGHT      LIGHT_SW
;       4 => VACATION       VAC_SW
;-----------------------------------------------------------------------------

switches:
                call    RS232
                ei
                clr     SW_DATA                     ; set the default to open "idle"
                cp      STATUS,#03d                 ; test for illegal number
                jp      ugt,start                   ; if so reset
                jp      z,charge                    ; if it is 3 then goto charge
                cp      STATUS,#02d                 ; test for vacation
```

```
        jp      z,VACATION_TEST         ; if so then jump
        cp      STATUS,#01d             ; test for worklight
        jp      z,WORKLIGHT_TEST        ; if so then jump
                                        ; else it id command
COMMAND_TEST:
        cp      VACFLAG,#00H            ; test for vacation mode
        jr      z,COMMAND_TEST1         ; if not vacation skip flash

        inc     VACFLASH                ; increase the vacation flash timer
        cp      VACFLASH,#10            ; test the vacation flash period
        jr      ult,COMMAND_TEST1       ; if lower period skip flash
        and     p3,#CCHARGE_SW          ; turn off wall switch
        or      p3,#DIS_SW              ; enable discharge
        cp      VACFLASH,#60d           ; test the time delay for max
        jr      nz,NOTFLASHED           ; if the flash is not done jump and ret
        clr     VACFLASH                ; restart the timer
NOTFLASHED:
        ret                             ; return


COMMAND_TEST1:
        tm      p0,#SWITCHES            ; command sw pressed?
        jr      nz,CMDOPEN              ; open command
        tm      P0,#10000000B           ; test the second command input
        jr      nz,CMDOPEN
CMDCLOSED:                              ; closed command
        call    DECVAC                  ; decrease vacation debounce
;       call    DECLIGHT                ; decrease light debounce
        cp      CMD_DEB,#0FFH           ; test for the max number
        jr      z,SKIPCMDINC            ; if at the max skip inc
        di
        inc     CMD_DEB                 ; increase the debouncer
        inc     BCMD_DEB                ; increase the debouncer
        ei
SKIPCMDINC:
        cp      CMD_DEB,#CMD_MAKE       ;
        jr      nz,CMDEXIT              ; if not made then exit
GOT_A_CMD:
        di
        ld      LAST_CMD,#055H          ; set the last command as command
cmd:    ld      SW_DATA,#CMD_SW         ; set the switch data as command
        cp      AUXLEARNSW,#100d        ; test the time
        jr      ugt,SKIP_LEARN
        push    RP
        srp     #LEARNEE_GRP
        call    SETLEARN                ; set the learn mode
        clr     SW_DATA                 ; clear the cmd
        pop     RP
        or      p0,#LIGHT_ON            ; turn on the light
        call    TURN_ON_LIGHT           ; turn on the light
SKIP_LEARN:
        ld      CMD_DEB,#0FFH           ; set the debouncer to ff one shot
        ld      BCMD_DEB,#0FFH          ; set the debouncer to ff one shot
CMDEXIT:
```

```
                ei
                or      p3,#CHARGE_SW               ; turn on the charge system
                and     p3,#CDIS_SW                 ;
                ld      SWITCH_DELAY,#CMD_DEL_EX        ; set the delay time to 8mS
                ld      STATUS,#CHARGE              ; charge time
CMDDELEXIT:
                ret                                 ;


CMDOPEN:                                            ; command switch open
                and     p3,#^LB ^C CHARGE_SW        ; turn off charging sw
                or      p3,#DIS_SW                  ; enable discharge
                ld      DELAYC,#16d                 ; set the time delay
DELLOOP:
                dec     DELAYC
                jr      nz,DELLOOP                  ; loop till delay is up
                tm      p0,#SWITCHES                ; command line still high
                jr      nz,TESTWL                   ; if so return later
                call    DECVAC                      ; if not open line dec all debouncers
                call    DECLIGHT                    ;
                call    DECCMD                      ; •
                ld      AUXLEARNSW,#0FFH            ; turn off the aux learn switch
                jr      CMDEXIT                     ; and exit

TESTWL:
                ld      STATUS,#WL_TEST             ; set to test for a worklight
                ret                                 ; return


WORKLIGHT_TEST:
                tm      p0,#SWITCHES                ; command line still high
                jr      nz,TESTVAC2                 ; exit setting to test for vacation
                call    DECVAC                      ; decrease the vacation debouncer
                call    DECCMD                      ; and the command debouncer
                cp      LIGHT_DEB,#0FFH             ; test for the max
                jr      z,SKIPLIGHTINC              ; if at the max skip inc
                inc     LIGHT_DEB                   ; inc debouncer
SKIPLIGHTINC:
                cp      LIGHT_DEB,#LIGHT_MAKE       ; test for the light make
                jr      nz,CMDEXIT                  ; if not then recharge delay
GOT_A_LIGHT:
                ld      LIGHT_DEB,#0FFH             ; set the debouncer to max
                ld      SW_DATA,#LIGHT_SW           ; set the data as worklight
                cp      RRTO,#101d                  ; test for code reception
                jr      ugt,CMDEXIT                 ; if not then skip the seting of flag
                clr     AUXLEARNSW                  ; start the learn timer
                jr      CMDEXIT                     ; then recharge

TESTVAC2:
                ld      STATUS,#VAC_TEST            ; set the next test as vacation
                ld      switch_delay,#VAC_DEL       ; set the delay
LIGHTDELEXIT:
                ret                                 ; return

VACATION_TEST:
                djnz    switch_delay,VACDELEXIT     ;
```

```
        tm      p0,#SWITCHES            ; command line still high
        jr      nz,EXIT_ERROR           ; exit with a error setting open state
        call    DECLIGHT                ; decrease the light debouncer
        call    DECCMD                  ; decrease the command debouncer
        cp      VAC_DEB,#0FFH           ; test for the max
        jr      z,VACINCSKIP            ; skip the incrementing
        inc     VAC_DEB                 ; inc vacation debouncer
VACINCSKIP:
        cp      VACFLAG,#00H            ; test for vacation mode
        jr      z,VACOUT                ; if not vacation use out time
VACIN:
        cp      VAC_DEB,#VAC_MAKE_IN    ; test for the vacation make point
        jr      nz,VACATION_EXIT        ; exit if not made
        jr      GOT_A_VAC               ;

VACOUT:
        cp      VAC_DEB,#VAC_MAKE_OUT   ; test for the vacation make point
        jr      nz,VACATION_EXIT        ; exit if not made
GOT_A_VAC:
        ld      VACCHANGE,#0AAH         ; set the toggle data
        ld      VAC_DEB,#0FFH           ; set vacation debouncer to max
VACATION_EXIT:
        ld      SWITCH_DELAY,#VAC_DEL_EX ; set the delay
        ld      STATUS,#CHARGE          ; set the next test as charge
VACDELEXIT:
        ret

EXIT_ERROR:
        call    DECCMD                  ; decrement the debouncers
        call    DECVAC                  ;
        call    DECLIGHT                ;
        ld      SWITCH_DELAY,#VAC_DEL_EX ; set the delay
        ld      STATUS,#CHARGE          ; set the next test as charge
        ret


charge:
        or      p3,#CHARGE_SW           ;
        and     p3,#CDIS_SW             ;
        dec     SWITCH_DELAY            ;
        jr      nz,charge_ret           ;
        ld      STATUS,#CMD_TEST        ;
charge_ret:
        ret


DECCMD:
        cp      CMD_DEB,#00H            ; test for the min number
        jr      z,SKIPCMDDEC            ; if at the min skip dec
        di
        dec     CMD_DEB                 ; decrement debouncer
        dec     BCMD_DEB                ; decrement debouncer
        ei
SKIPCMDDEC:
```

```
            cp      CMD_DEB,#CMD_BREAK          ; if not at break then exit
            jr      nz,DECCMDEXIT               ; if not break then exit
            di
            clr     CMD_DEB                     ; reset the debouncer
            clr     BCMD_DEB                    ; reset the debouncer
            ei
DECCMDEXIT:
            ret                                 ; and exit


DECLIGHT:
            cp      LIGHT_DEB,#00H              ; test for the min number
            jr      z,SKIPLIGHTDEC              ; if at the min skip dec
            dec     LIGHT_DEB                   ; decrement debouncer
SKIPLIGHTDEC:
            cp      LIGHT_DEB,#LIGHT_BREAK      ; if not at break then exit
            jr      nz,DECLIGHTEXIT             ; if not break then exit
            clr     LIGHT_DEB                   ; reset the debouncer
DECLIGHTEXIT:
            ret                                 ; and exit


DECVAC:
            cp      VAC_DEB,#00H                ; test for the min number
            jr      z,SKIPVACDEC                ; if at the min skip dec
            dec     VAC_DEB                     ; decrement debouncer
SKIPVACDEC:
            cp      VACFLAG,#00H                ; test for vacation mode
            jr      z,DECVACOUT                 ; if not vacation use out time
DECVACIN:
            cp      VAC_DEB,#VAC_BREAK_IN       ; test for the vacation break point
            jr      nz,DECVACEXIT               ; exit if not
            jr      CLEARVACDEB                 ;

DECVACOUT:
            cp      VAC_DEB,#VAC_BREAK_OUT      ; test for the vacation break point
            jr      nz,DECVACEXIT               ; exit if not
CLEARVACDEB:
            clr     VAC_DEB                     ; reset the debouncer
DECVACEXIT:
            ret                                 ; and exit


;-----------------------------------------------------------------------------
;           THIS ROUTINE GENERATES THE RAMP FOR THE COMPARATORS
;-----------------------------------------------------------------------------

PWM:
            push    rp                          ; save current pointer
            srp     #PWM_GROUP                  ;
            and     p3,#^C PWM_HI               ; take pwm output low
            tm      p0,#DOWN_COMP               ; was it down force?
            jr      nz,test_up                  ; no, test up force
            ld      dn_temp,pulsewidth          ; save setting
test_up:
```

```
        tm      p0,#UP_COMP             ; up force trip?
        jr      nz,update_pwm           ; should be high
        ld      up_temp,pulsewidth      ; save setting
update_pwm:
        add     pulsewidth,#4           ; increase pulsewidth
        djnz    pwm_count,pwm_exit      ;

GOT_FORCE_ADDRESS:
        ei                              ; turn on stacked interrupts
        rcf                             ;
        rrc     dn_temp                 ; /2
        rcf                             ;
        rrc     dn_temp                 ; /2
        rcf                             ;
        rrc     up_temp                 ; /2
        rcf                             ;
        rrc     up_temp                 ; /2
        ld      DNFORCE,dn_temp         ; save the values
        ld      UPFORCE,up_temp

        cp      dn_temp,#064d           ; test the last address
        jr      ult,DN_ADDRESS_OK       ; if in the range ok
        ld      dn_temp,#064d           ; if out of the range set to the top
DN_ADDRESS_OK:

        ld      force_add_hi,dn_temp    ; REVERSE THE ROTATION
        ld      dn_temp,#64d            ;
        sub     dn_temp,force_add_hi

        ld      force_add_hi,#^hb force_table_60
        ld      force_add_lo,#^lb force_table_60
        tm      p2,#00100000b           ; test the 50/60 bit
        jr      nz,DN60
        ld      force_add_hi,#^hb force_table_50
        ld      force_add_lo,#^lb force_table_50
DN60:
        add     force_add_lo,dn_temp    ; calculate the address add 2X temp
        adc     force_add_hi,#00h       ;
        add     force_add_lo,dn_temp    ; calculate the address add 2X temp
        adc     force_add_hi,#00h       ;

        di
        ldc     dn_force_hi,@force_add  ; get hi byte
        incw    force_add               ; get low byte
        ldc     dn_force_lo,@force_add  ;
        ei

        cp      up_temp,#064d           ; test the last address
        jr      ult,UP_ADDRESS_OK       ; if in the range ok
        ld      up_temp,#064d           ; if out of the range set to the top

UP_ADDRESS_OK:

        ld      force_add_hi,up_temp    ; REVERSE THE ROTATION
        ld      up_temp,#64d            ;
        sub     up_temp,force_add_hi
```

```
                ld      force_add_hi,#^hb force_table_60
                ld      force_add_lo,#^lb force_table_60
                tm      p2,#00100000b              ; test the 50/60 bit
                jr      nz,UP60
                ld      force_add_hi,#^hb force_table_50
                ld      force_add_lo,#^lb force_table_50
UP60:

                add     force_add_lo,up_temp       ; calculate the address add 2X temp
                adc     force_add_hi,#00h          ;
                add     force_add_lo,up_temp       ; calculate the address add 2X temp
                adc     force_add_hi,#00h          ;

                di
                ldc     up_force_hi,@force_add     ; get hi byte
                incw    force_add                  ; get low byte
                ldc     up_force_lo,@force_add     ;
                ei

GOT_FORCE:

                ld      PWM_STATUS,#0FFH           ;
                ld      pwm_count,#TOTAL_PWM_COUNT     ; max count
                ld      pulsewidth,#MIN_COUNT      ; set initial pulsewidth
                ld      dn_temp,#MIN_COUNT         ; start initial pw
                ld      up_temp,#MIN_COUNT         ;
pwm_exit:
                ld      t1,pulsewidth              ; load timer with pulse
                pop     rp                         ; restore pointer
                iret                               ; return from int


;-------------------------------------------------------------------------------
; 66            FORCE TABLE
;-------------------------------------------------------------------------------
force_table_60:
S_0:            .word           0DACH
S_1:            .word           0DACH
S_2:            .word           0DC5H
S_3:            .word           0DDEH
S_4:            .word           0DF7H
S_5:            .word           0E10H
S_6:            .word           0E29H
S_7:            .word           0E42H
S_8:            .word           0E5BH
S_9:            .word           0E6DH
S_10:           .word           0E7FH
S_11:           .word           0E91H
S_12:           .word           0E9BH
S_13:           .word           0EA5H
S_14:           .word           0EAFH
S_15:           .word           0EB9H
S_16:           .word           0EC3H
S_17:           .word           0ECDH
```

```
S_18:    .word    0ED7H
S_19:    .word    0EE1H
S_20:    .word    0EEBH
S_21:    .word    0EF5H
S_22:    .word    0EFFH
S_23:    .word    0F09H
S_24:    .word    0F13H
S_25:    .word    0F1DH
S_26:    .word    0F27H
S_27:    .word    0F31H
S_28:    .word    0F3BH
S_29:    .word    0F45H
S_30:    .word    0F4FH
S_31:    .word    0F59H
S_32:    .word    0F63H
S_33:    .word    0F6DH
S_34:    .word    0F86H
S_35:    .word    0F9FH
S_36:    .word    0FB8H
S_37:    .word    0FD0H
S_38:    .word    0FEAH
S_39:    .word    1003H
S_40:    .word    101CH
S_41:    .word    1035H
S_42:    .word    104EH
S_43:    .word    1067H
S_44:    .word    1099H
S_45:    .word    10CBH
S_46:    .word    10FDH
S_47:    .word    112FH
S_48:    .word    1161H
S_49:    .word    1193H
S_50:    .word    11C5H
S_51:    .word    1229H
S_52:    .word    125BH
S_53:    .word    12BFH
S_54:    .word    1323H
S_55:    .word    13C1H
S_56:    .word    14FCH
S_57:    .word    16D6H
S_58:    .word    194DH
S_59:    .word    1C62H
S_60:    .word    2014H
S_61:    .word    2465H
S_62:    .word    2954H
S_63:    .word    2EE0H
S_64:    .word    2EE0H

         FILL
         FILL
         FILL
         FILL
         FILL
         FILL
         FILL
         FILL
```

```
        FILL
        FILL

.end
```

What is claimed is:

1. A barrier operator for moving a movable barrier, comprising:

an electric motor;

a transmission system connectable to the electric motor for providing mechanical drive to the movable barrier;

a radio frequency receiver;

a decoder coupled to receive a demodulated signal from the radio frequency receiver;

means for recognizing a learn mode code received by the radio frequency receiver and producing a learn code enable signal in response thereto; and means operative for a predetermined period of time after the reception of a learn mode code for storing a security code received by the radio receiver subsequent to the learn enable code having been received.

2. A barrier operator for moving a garage door or other barrier, comprising:

an electric motor positioned in a control head;

a security code receiver for controlling the electric motor in response to a received security code when said received security code matches a code stored in the receiver;

first apparatus for generating a first learn signal identifying a learn mode of operation;

second apparatus remote from the first apparatus for generating a second learn signal identifying the learn mode of operation;

circuitry for generating a security code to be stored in the security code receiver; and the security code receiver comprises means responsive to either of the first learn signal and the second learn signal for storing the security code generated by the circuitry for generating a security code in the security code receiver.

3. A barrier operator for moving a garage door or other barrier in accordance with claim 2:

wherein the first apparatus comprises a learn switch positioned on the control head; and the second apparatus comprises a control panel connected for transmitting a base band second learn signal by wire to the security code receiver.

4. A barrier operator for moving a garage door or other barrier in accordance with claim 3:

wherein the control panel comprises a plurality of panel switches connected to apparatus for generating signals of predetermined time duration for each panel switch pressed.

5. A barrier operator for moving a garage door or other barrier in accordance with claim 4:

wherein one of the panel switches is a learn mode switch for generating the second learn signal.

6. A barrier operator for moving a garage door or other barrier in accordance with claim 2:

wherein the first apparatus comprises a learn switch positioned on the control head; and the second apparatus comprises a wireless transmitter for wirelessly transmitting a second learn signal comprising a code identifying the learn mode; and the security code receiver comprises a wireless receiver for receiving the second learn signal.

7. A security code learning system for a security code responding barrier operator, comprising:

a memory for storing an existing security code;

a wireless transmitter for transmitting selectable security codes, including a first security code and a second security code;

a receiver for receiving transmitted security codes; and security code update means responsive to security codes received by said receiver, for storing said second security code in said memory when said first security code matches said existing security code stored in said memory.

8. A system according to claim 7, further comprising learn mode means responsive to a third security code identifying a code learn mode transmitted from said wireless transmitter for enabling said security code update means.

9. A system according to claim 7, further comprising:

a portable transmitter for transmitting a new security code; and a control panel mounted inside the garage for producing a code replacement command signal; and wherein said security code update means stores the new security code in said memory in response to the code replacement command signal.

10. A system according to claim 9, wherein said control panel includes a command button which when actuated causes the garage door operator to open and close the garage door.

11. A system according to claim 10, wherein said control panel comprises a work light button, which activates a garage light when actuated, and wherein the code replacement command signal is produced when the work light button and the command button are actuated simultaneously.

12. A system according to claim 7, wherein said security codes are serial signals characterized by a variable time characteristic.

* * * * *